(12) United States Patent
Sullivan et al.

(10) Patent No.: US 10,737,851 B2
(45) Date of Patent: Aug. 11, 2020

(54) LID FOR CONTAINER

(71) Applicant: YETI Coolers, LLC, Austin, TX (US)

(72) Inventors: Derek G. Sullivan, Austin, TX (US); Andy Bondhus, Austin, TX (US); Evan Goldberg, Austin, TX (US); Roy Joseph Seiders, Rollingwood, TX (US)

(73) Assignee: YETI Coolers, LLC, Austin, TX (US)

(*) Notice: Subject to any disclaimer, the term of this patent is extended or adjusted under 35 U.S.C. 154(b) by 0 days.

(21) Appl. No.: 15/628,442

(22) Filed: Jun. 20, 2017

(65) Prior Publication Data

US 2018/0037377 A1    Feb. 8, 2018

Related U.S. Application Data

(60) Provisional application No. 62/352,330, filed on Jun. 20, 2016.

(51) Int. Cl.
*B65D 47/12* (2006.01)
*B65D 51/24* (2006.01)
(Continued)

(52) U.S. Cl.
CPC ........ *B65D 47/122* (2013.01); *A47J 31/4407* (2013.01); *B65D 25/2894* (2013.01);
(Continued)

(58) Field of Classification Search
CPC ...... B65D 47/122; B65D 47/20; B65D 41/22; B65D 43/0231; B65D 43/0229; A47G 19/22
(Continued)

(56) References Cited

U.S. PATENT DOCUMENTS

D192,192 S    2/1962    Tupper
4,090,660 A    5/1978    Schram et al.
(Continued)

FOREIGN PATENT DOCUMENTS

CN    1438159 A    8/2003
CN    101549769 A    10/2009
(Continued)

OTHER PUBLICATIONS

Aug. 23, 2017—(WO) International Search Report and Written Opinion—APP. PCT/US2017/038344.
(Continued)

*Primary Examiner* — Jeffrey R Allen
(74) *Attorney, Agent, or Firm* — Banner & Witcoff, Ltd.

(57) ABSTRACT

An insulating container may include an opening, which can be sealed by a closure. The closure may have an upper portion with a handle that has a circular curvature equal to the cylindrical portion of the closure. The closure may also have a lower portion that is joined to the upper portion by an injection molded polymer element. The closure may also be in the form of "flip" type of closure such that the lid can be selectably opened or closed by the user by rotating a flip closure into either the opened or closed position. The closure may also be a two-part lid having a lower cap that may be configured to be removably-coupled to the container and an upper cap that may be configured to be removably-coupled to the lower cap.

10 Claims, 24 Drawing Sheets

(51) Int. Cl.

| | | |
|---|---|---|
| *B65D 81/38* | (2006.01) | |
| *B65D 47/08* | (2006.01) | |
| *B65D 51/16* | (2006.01) | |
| *B65D 43/02* | (2006.01) | |
| *B65D 25/28* | (2006.01) | |
| *A47J 31/44* | (2006.01) | |
| *B65D 41/04* | (2006.01) | |
| *B65D 51/18* | (2006.01) | |
| *B65D 53/00* | (2006.01) | |

(52) U.S. Cl.
CPC ..... *B65D 41/0435* (2013.01); *B65D 43/0229* (2013.01); *B65D 47/0895* (2013.01); *B65D 47/121* (2013.01); *B65D 51/1683* (2013.01); *B65D 51/18* (2013.01); *B65D 51/242* (2013.01); *B65D 53/00* (2013.01); *B65D 81/3818* (2013.01); *B65D 81/3841* (2013.01); *B65D 81/3869* (2013.01); *B65D 2251/009* (2013.01); *B65D 2251/0025* (2013.01); *B65D 2251/0028* (2013.01); *B65D 2251/0078* (2013.01); *B65D 2251/0087* (2013.01); *B65D 2525/283* (2013.01); *B65D 2543/0049* (2013.01); *B65D 2543/00092* (2013.01); *B65D 2543/00231* (2013.01); *B65D 2543/00296* (2013.01); *B65D 2543/00509* (2013.01); *B65D 2543/00546* (2013.01); *B65D 2543/00851* (2013.01)

(58) Field of Classification Search
USPC ..................................... 220/254.3
See application file for complete search history.

(56) References Cited

U.S. PATENT DOCUMENTS

| | | | |
|---|---|---|---|
| 4,202,459 A | 5/1980 | DeParales et al. | |
| 4,408,703 A | 10/1983 | Libit | |
| D288,667 S | 3/1987 | Miner | |
| 5,344,045 A | 9/1994 | Richter et al. | |
| D363,666 S | 10/1995 | Goto et al. | |
| 5,498,333 A | 3/1996 | Canther | |
| 5,574,252 A * | 11/1996 | Hill ........................ | H01R 35/02 174/51 |
| 5,746,338 A | 5/1998 | Takahashi et al. | |
| D416,755 S | 11/1999 | Trombly | |
| D485,759 S | 1/2004 | Janky et al. | |
| D504,796 S | 5/2005 | Schuler et al. | |
| 7,134,575 B2 * | 11/2006 | Vogel ................ | B65D 21/0217 222/143 |
| D544,749 S | 6/2007 | Seum et al. | |
| D552,926 S | 10/2007 | Yelland | |
| D584,566 S | 1/2009 | Fuller | |
| D608,140 S | 1/2010 | Gilbert | |
| D623,017 S | 9/2010 | George | |
| D627,600 S | 11/2010 | Eyal | |
| D643,245 S | 8/2011 | Minarsch | |
| D644,060 S | 8/2011 | Komeiji | |
| D647,753 S | 11/2011 | Lin | |
| D655,570 S | 3/2012 | Meehan | |
| D655,604 S | 3/2012 | Molina et al. | |
| D655,967 S | 3/2012 | Bodum | |
| D662,354 S | 6/2012 | Bodum | |
| 8,215,511 B1 | 7/2012 | Lin | |
| D666,052 S | 8/2012 | Trombly | |
| D667,263 S | 9/2012 | Gilbert et al. | |
| 8,276,776 B2 * | 10/2012 | Roth ........................ | A47G 19/22 220/254.1 |
| D674,663 S | 1/2013 | Cahen | |
| D691,416 S | 10/2013 | Eyal | |
| D692,756 S | 11/2013 | McClellan et al. | |
| D696,900 S | 1/2014 | George et al. | |
| D710,698 S | 8/2014 | Giraud et al. | |
| D715,100 S | 10/2014 | Eyal | |
| D717,103 S | 11/2014 | Wilbur | |
| D717,115 S * | 11/2014 | Lane ............................ | D7/511 |
| D721,535 S | 1/2015 | Chapman et al. | |
| D721,540 S | 1/2015 | Grcic | |
| 8,936,170 B2 * | 1/2015 | Dyer ..................... | B65D 47/20 220/254.3 |
| D732,337 S | 6/2015 | Coon et al. | |
| D747,199 S | 1/2016 | Phillips | |
| D751,340 S | 3/2016 | Seiders et al. | |
| D751,341 S | 3/2016 | Seiders et al. | |
| D752,381 S | 3/2016 | Wahl | |
| D752,397 S | 3/2016 | Seiders et al. | |
| 9,346,076 B1 | 5/2016 | Ford | |
| D761,618 S | 7/2016 | Lapsker | |
| D764,869 S | 8/2016 | Smrtnik et al. | |
| D772,651 S | 11/2016 | Leonard et al. | |
| D779,872 S | 2/2017 | Bergstrom | |
| D780,531 S | 3/2017 | Seiders et al. | |
| D789,737 S | 6/2017 | Eyal | |
| D795,020 S | 8/2017 | Seiders et al. | |
| D796,256 S | 9/2017 | Stover et al. | |
| D799,899 S | 10/2017 | Rummel et al. | |
| D801,746 S | 11/2017 | Thuma et al. | |
| D802,362 S | 11/2017 | Spivey et al. | |
| D803,619 S | 11/2017 | Seiders et al. | |
| D803,684 S | 11/2017 | Seiders et al. | |
| D804,905 S | 12/2017 | Seiders et al. | |
| D805,838 S | 12/2017 | Guthrie | |
| D807,701 S | 1/2018 | Bo | |
| D808,218 S | 1/2018 | Seiders et al. | |
| D814,240 S | 4/2018 | Kabalin | |
| 10,252,838 B2 * | 4/2019 | Ban ........................ | B65D 43/22 |
| 2010/0288782 A1 | 11/2010 | Lin | |
| 2011/0114655 A1 | 5/2011 | Bailey | |
| 2012/0125931 A1 | 5/2012 | Roth et al. | |
| 2013/0186918 A1 | 7/2013 | Menceles et al. | |
| 2014/0251938 A1 | 9/2014 | Rose et al. | |
| 2014/0374418 A1 | 12/2014 | Ouellette | |
| 2015/0021345 A1 | 1/2015 | Wu | |
| 2015/0266597 A1 | 9/2015 | Hertzog et al. | |
| 2017/0043916 A1 | 2/2017 | Seiders et al. | |
| 2017/0273484 A1 | 9/2017 | Spivey et al. | |

FOREIGN PATENT DOCUMENTS

| | | |
|---|---|---|
| CN | 103442994 A | 12/2013 |
| EP | 0654417 A1 | 5/1995 |
| EP | 1332977 A1 | 8/2003 |
| GB | 253358 A | 6/1926 |
| WO | 2011147036 A1 | 12/2011 |

OTHER PUBLICATIONS

"Bodum Insulated Plastic Travel Mug". Found online Mar. 9, 2017 at amazon.com. Page dated Aug. 10, 2012. Retrieved from <https://www.amazon.com/...d-Plastic-0-45-Liter-15-Ounce/dp/B0093EPIG0/ref=sr_1_133?ie=UTF8&qid=1489084258&sr=8-133&keywords=mug+lid&refinements=p_72%3A2661621011>.

"Dunkin Donuts Stainless Steel Travel Mug". Found online Mar. 9, 2017 at ebay.com. Page dated 2012. <http://www.ebay.com/...-Steel-Orange-Lid-Travel-Mug-Cup-Tumbler-Collectible-14z-/282119881890?roken=cUgayN&nma=true&si=vbBRUtUfjYDAX%252FF9%252BjwOhPV%252Fbio%253D&orig_cvip=true&rt=nc&_trksid=p2047675.12557>.

"Nutri Ninja Blender 24 oz Cup and Sip N Seal Lid". Found online Aug. 14, 2018 at amazon.com. Page dated Oct. 29, 2015. Retrieved from <http://www.amazon.com/UTF8&pd_rd_i=B017C5O1G4&pd_rd_r=4CQK27ABX6AHV038GMGF&pd_rd_w=jABEu&pd_rd_wg=zg0K2&psc+1&refRID=4CQK27ABX6AHV038GMGF>.

"Wazzala—Bamboo Eco Travel Mug". Found online Aug. 14, 2018 at amazon.com. Page dated Apr. 3, 2016. Retrieved from <http://www.amazon.com/Elegant-Reusable-Splash-Proff-Silicone-Included/dp/B01CKXK4VY/ref=sr_1_33?ie=UTF8&qid=1488839680&sr=8-33&keywords=travel+mug>.

(56) References Cited

OTHER PUBLICATIONS

"Contigo Extreme Stainless Steel Travel Mug". Found online Mar. 9, 2017 at amazon.com. Page dated Sep. 13, 2016. Retrieved from https://www.amazon.com/Contigo-Extreme-Stainless-Insulated-Limited/dp/B01LZGBMKT/ref-od_sim_79_3?_encoding=UTF8&psc=&refRID=A4VHP8EG6AKH3BG73BMZ.

"Bubba Hero Bottle Replacement Lid". Found online Mar. 9, 2017 at amazon.com. Page dated Jan. 14, 2015. Retrieved from https://www.amazon.com/bubba-HERO-bottle-replacement-lid/dp/B00QQYDI44/ref=cm_cr_arp_d_product_top?ie=UTF8.

"Hydro Flask Wide Mouth Hydro Flip Lid". Found online Mar. 9, 2017 at amazon.com. Page dated Oct. 9, 2012. Retrieved from http://www.amazon.com/Hydro-Flask-Wide-Mouth-Black/dp/B01GW2H430/ref=cm_cr_arp_d_product_top?ie=UTF8.

"Bubba Brands Classic Insulated Travel Mug". Found online Mar. 9, 2017 at amazon.com. Page dated Sep. 30, 2010. Retrieved from https://www.amazon.com/Bubba-Brands-1953403-Classic-Insulated/dp/B01FB7IG8Y/ref=cm_cr_arp_d_product_top?ie=UTF8.

Hydro Flask. Hydro Flip. 2015 [earliest online date], [site visited Apr. 28, 2017]. Available from Internet, <URL:https://www.hydroflask.com/hydro-flilp#92=57>.

Jane. Spill Resistant Flip Lid and Yeti Accessories. Dec. 5, 2016 [earliest online date], [site visited Apr. 28, 2017]. Available from Internet, <URL:https://jane.com/dea1/263319/spill-resistant-flip-lid-and-yeti-accessories-30oz-many-colors>.

Aug. 23, 2017—(WO) International Search and Written Opinion—App. PCT/US2017/038341.
Oct. 10, 2019—(EP) OA—App. No. 17734605.3.
Sep. 24, 2019—(CN) OA—App. No. 201780050616.1.
Aug. 21, 2019—(AU) Examination Report No. 1—App. No. 2017280047.
Mar. 15, 2019 (AU) Examination Report—App. 2017280045.
Nov. 5, 2019—(CA) Examiners Report—App. No. 3028384.
Nov. 21, 2019—(CA) Examiner's Report—App. No. 3,027,562.
Aug. 23, 2017—(WO) ISR and WO—App. No. PCT/US2017/038344.
Dec. 5, 2019—(AU) OA—App. No. 2017280045.
Nov. 25, 2019—(CN) Office Action—App. No. 201780050901.3.
Feb. 13, 2020—(AU) Examination Report—App. No. 2017280047.

\* cited by examiner

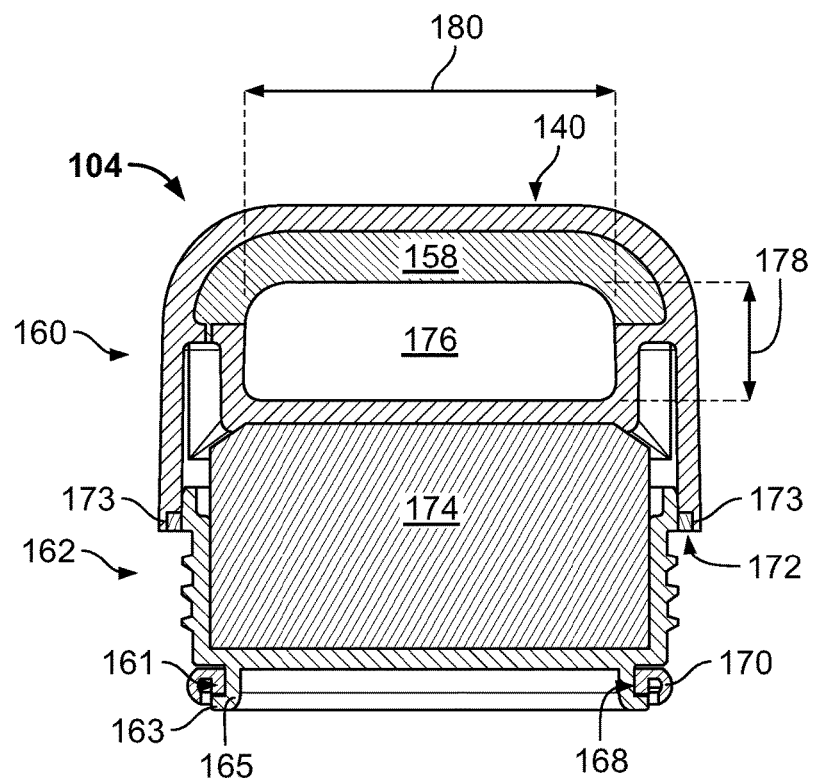
FIG. 5
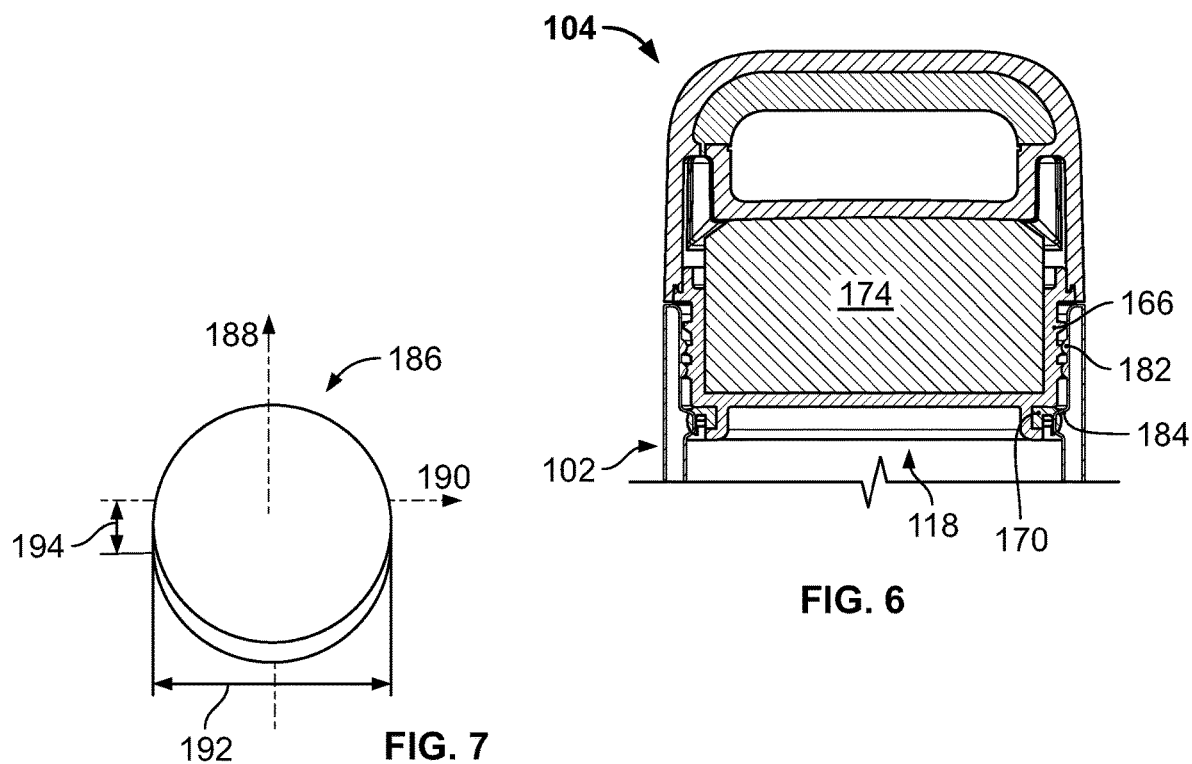
FIG. 7
FIG. 6

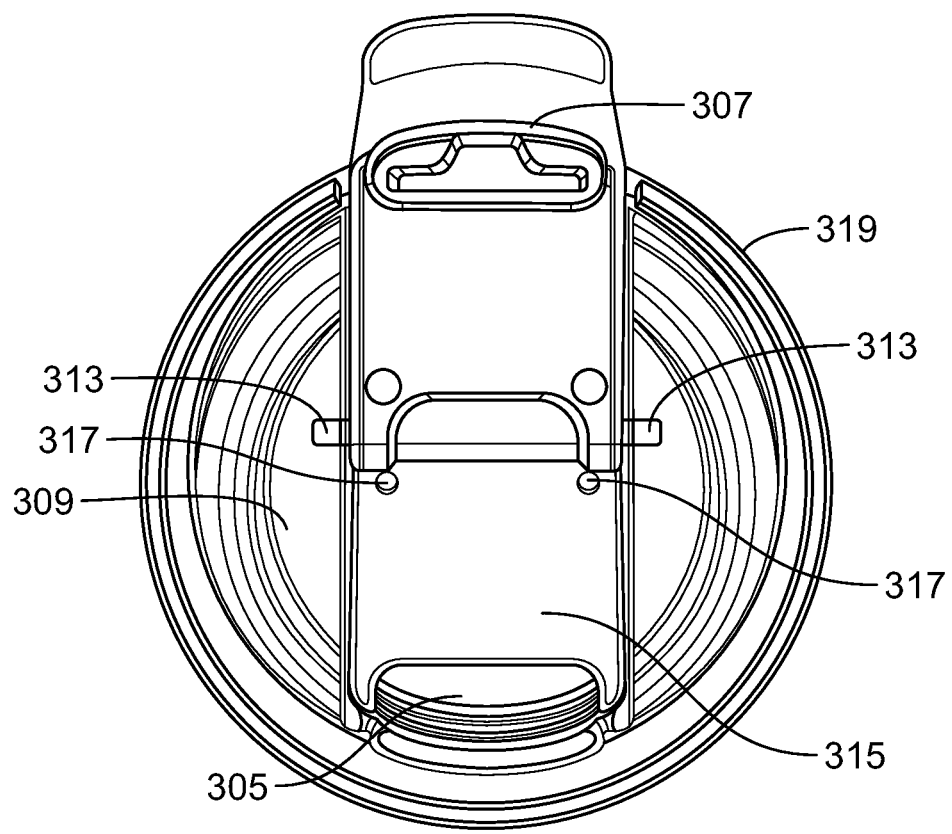
FIG. 13
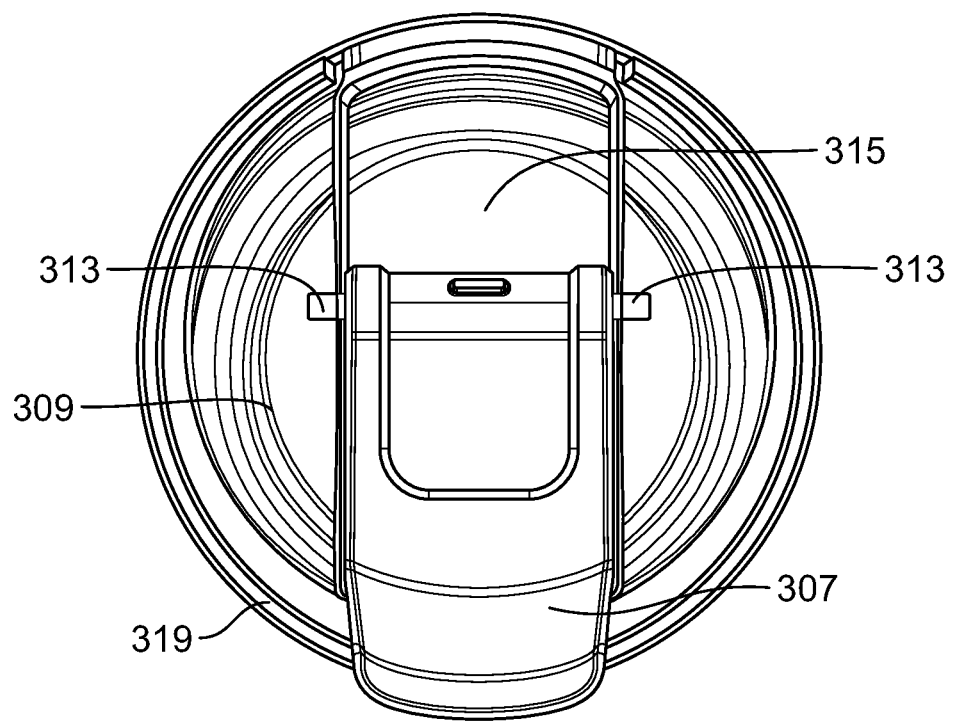
FIG. 13A1

FIG. 13A2

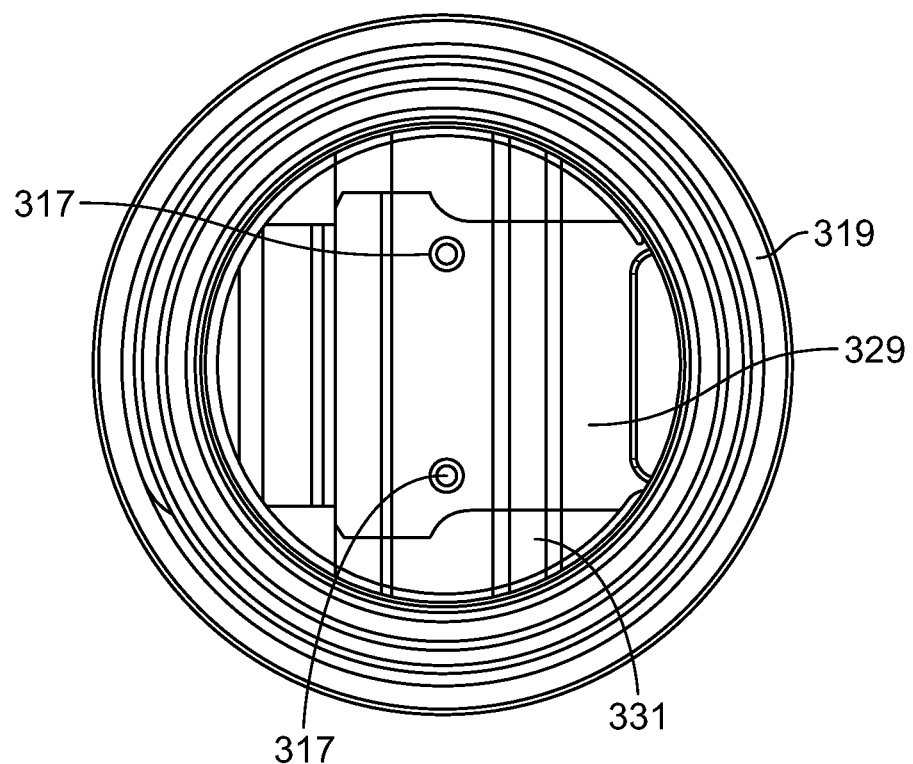
FIG. 13C
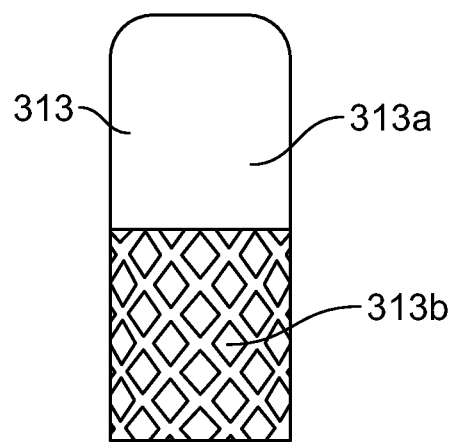
FIG. 13C1

SECTION H-H

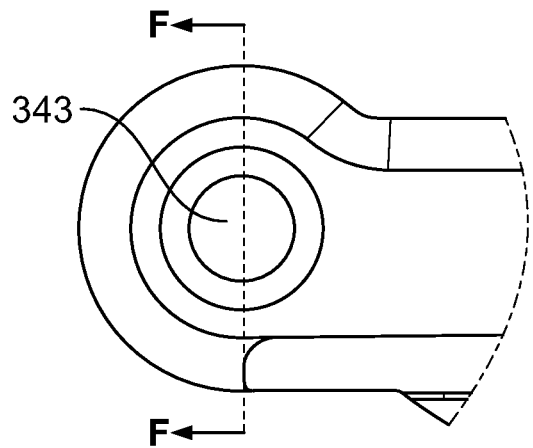
FIG. 14F
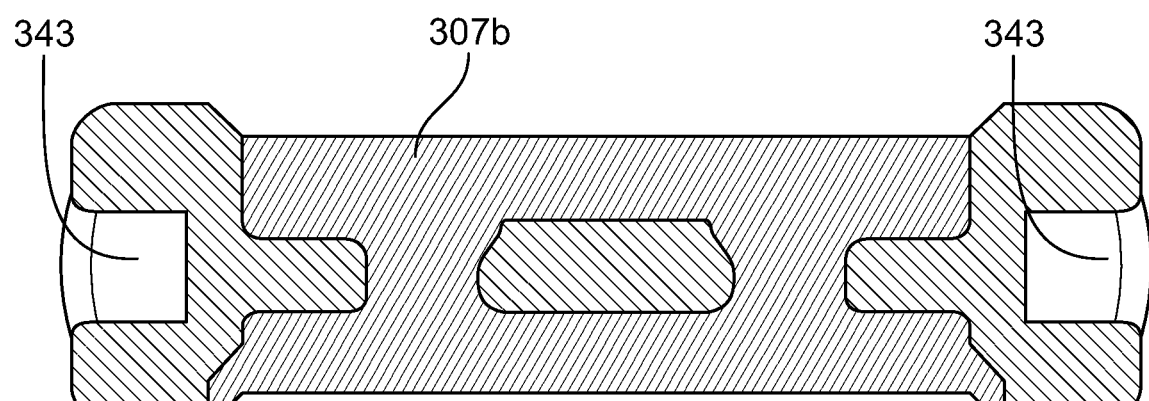
SECTION F-F
FIG. 14F1

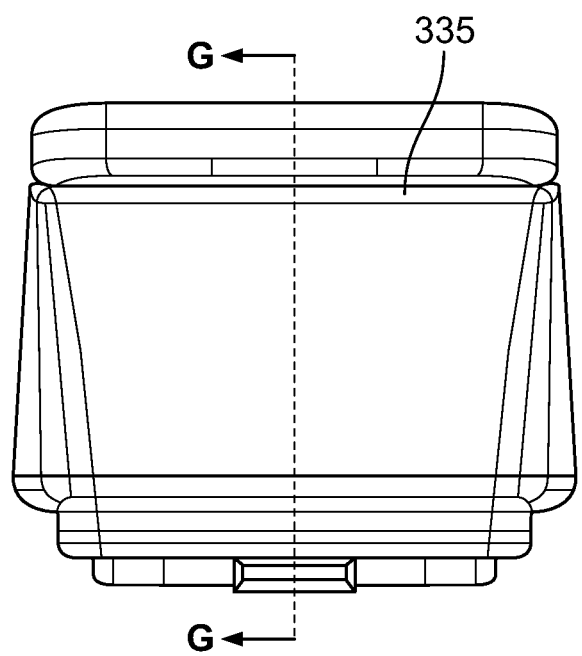
FIG. 14G
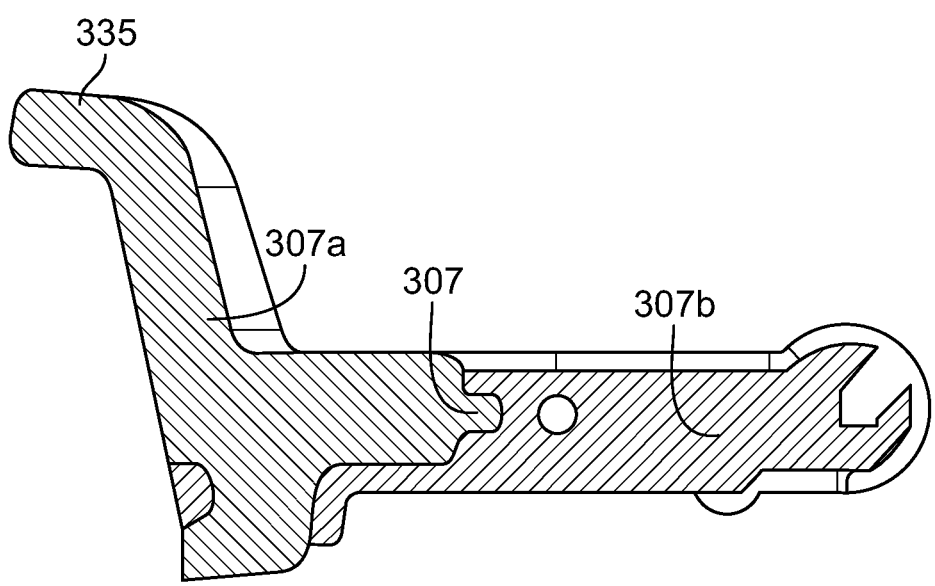
SECTION G-G
FIG. 14G1

LID FOR CONTAINER

CROSS REFERENCE TO RELATED APPLICATION

The present application claims priority to U.S. application Ser. No. 62/352,330 filed on Jun. 20, 2016, which is hereby incorporated fully by reference for any non-limiting purposes. This application also relates to U.S. application Ser. No. 15/197,180 filed on Jun. 29, 2016, which is incorporated herein by reference for any non-limiting purposes.

BACKGROUND

A container may be configured to store a volume of liquid. Containers can be filled with hot or cold drinkable liquids, such as water, coffee, tea, a soft drink, or an alcoholic beverage, such as beer. These containers can be formed of a double-wall vacuumed formed construction to provide insulative properties to help maintain the temperature of the liquid within the container.

BRIEF SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In certain examples, an insulating device can be configured to retain a volume of liquid. The insulating device can include a container with a first inner wall having a first end with an opening extending into an internal reservoir for receiving liquid, along with a second outer wall and a bottom portion forming an outer shell of the container. The bottom portion may form a second end configured to support the container on a surface.

The insulating device may include a lid configured to seal the opening of the container, and having an upper portion coupled to a lower portion by an injection molded polymer element using a three-shot injection molding process. The lid may also be in the form of "flip" type of closure such that the lid can be selectably opened or closed by the user by rotating a flip closure into either the opened or closed position. The lid may also be a two-part lid having a lower cap that may be configured to be removably-coupled to the container and an upper cap that may be configured to be removably-coupled to the lower cap.

BRIEF DESCRIPTION OF THE DRAWINGS

The present disclosure is illustrated by way of example and not limited in the accompanying figures in which like reference numerals indicate similar elements and in which:

FIG. 5 depicts a cross-sectional view of the lid of FIG. 4, according to one or more aspects described herein.

FIG. 6 depicts an enlarged cross-sectional view of the lid removably coupled to a container, according to one or more aspects described herein.

FIG. 7 schematically depicts a vacuum-insulated puck, according to one or more aspects described herein.

FIG. 13 shows a top view of an example lid that can be used in conjunction with an insulating device in an opened position.

FIG. 13A1 shows a top view of the example lid of FIG. 13 in a closed position.

FIG. 13A2 shows a top view of the example lid of FIG. 13 without the closure.

FIG. 13C shows a bottom view of the example lid of FIG. 13A2.

FIG. 13C1 shows an example pin that can be used in conjunction with the example lid of FIG. 13.

FIG. 14F shows a portion of the example flip closure of FIG. 14A.

FIG. 14F1 shows another cross-sectional view of the flip closure of FIG. 14A.

FIG. 14G shows a front view of the example flip closure of FIG. 14A.

FIG. 14G1 shows another cross-sectional view of the flip closure of FIG. 14A.

Further, it is to be understood that the drawings may represent the scale of different components of various examples; however, the disclosed examples are not limited to that particular scale.

DETAILED DESCRIPTION

In the following description of the various examples, reference is made to the accompanying drawings, which form a part hereof, and in which is shown by way of illustration various examples in which aspects of the disclosure may be practiced. It is to be understood that other examples may be utilized and structural and functional modifications may be made without departing from the scope and spirit of the present disclosure.

Figure 1:
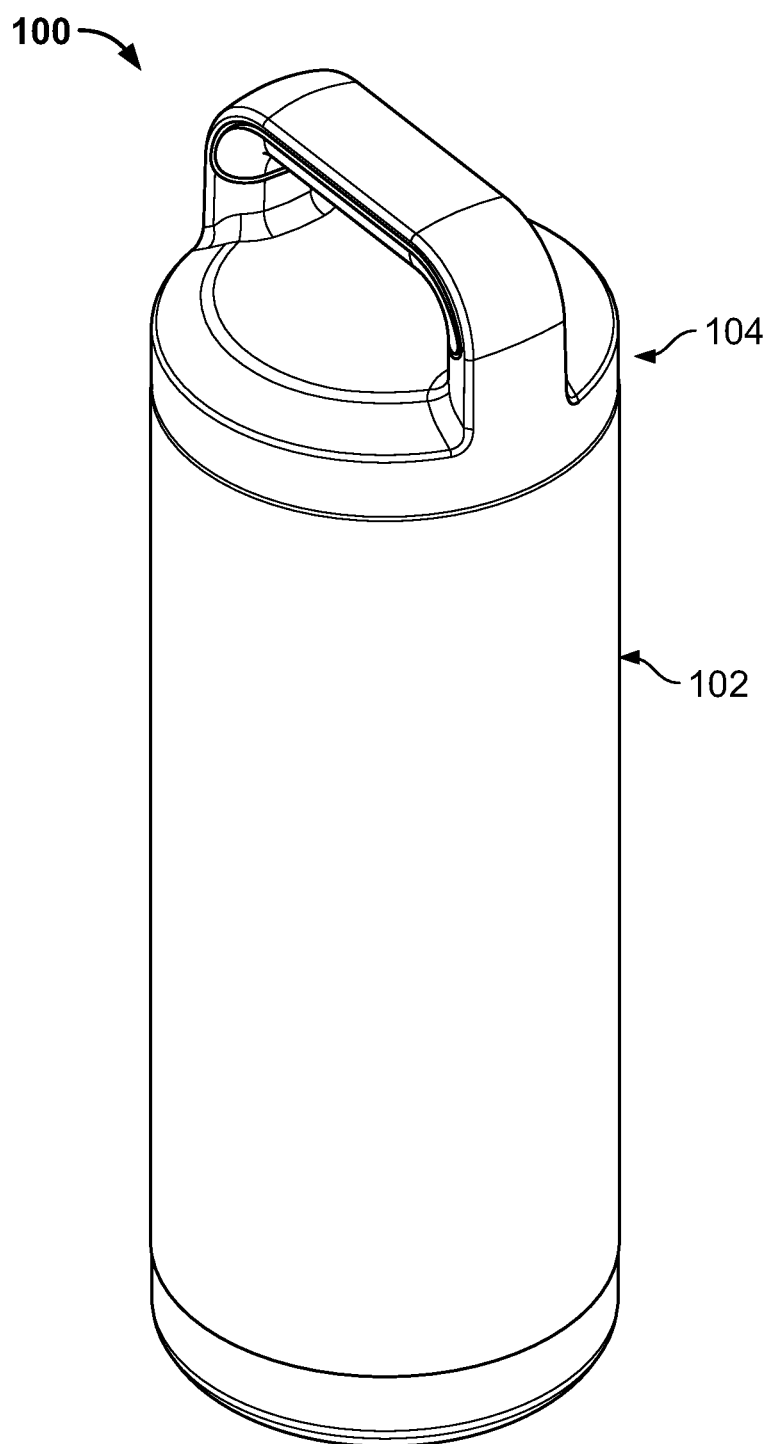
FIG. 1 depicts an isometric view of an example insulating device, according to one or more aspects described herein.

FIG. 1 depicts an isometric view of an insulating device 100. In one example, the device 100 may be configured to store a volume of liquid. The device 100 may comprise a container 102 and a lid or closure 104 that may be removably coupled thereto. In one example, the container 102 may be substantially cylindrical in shape. As such, in one example, the container 102 may be referred to as a canister. In various examples, the container 102 may be referred to as a bottom portion, base, or insulated base structure having a substantially cylindrical shape.

Figure 2:
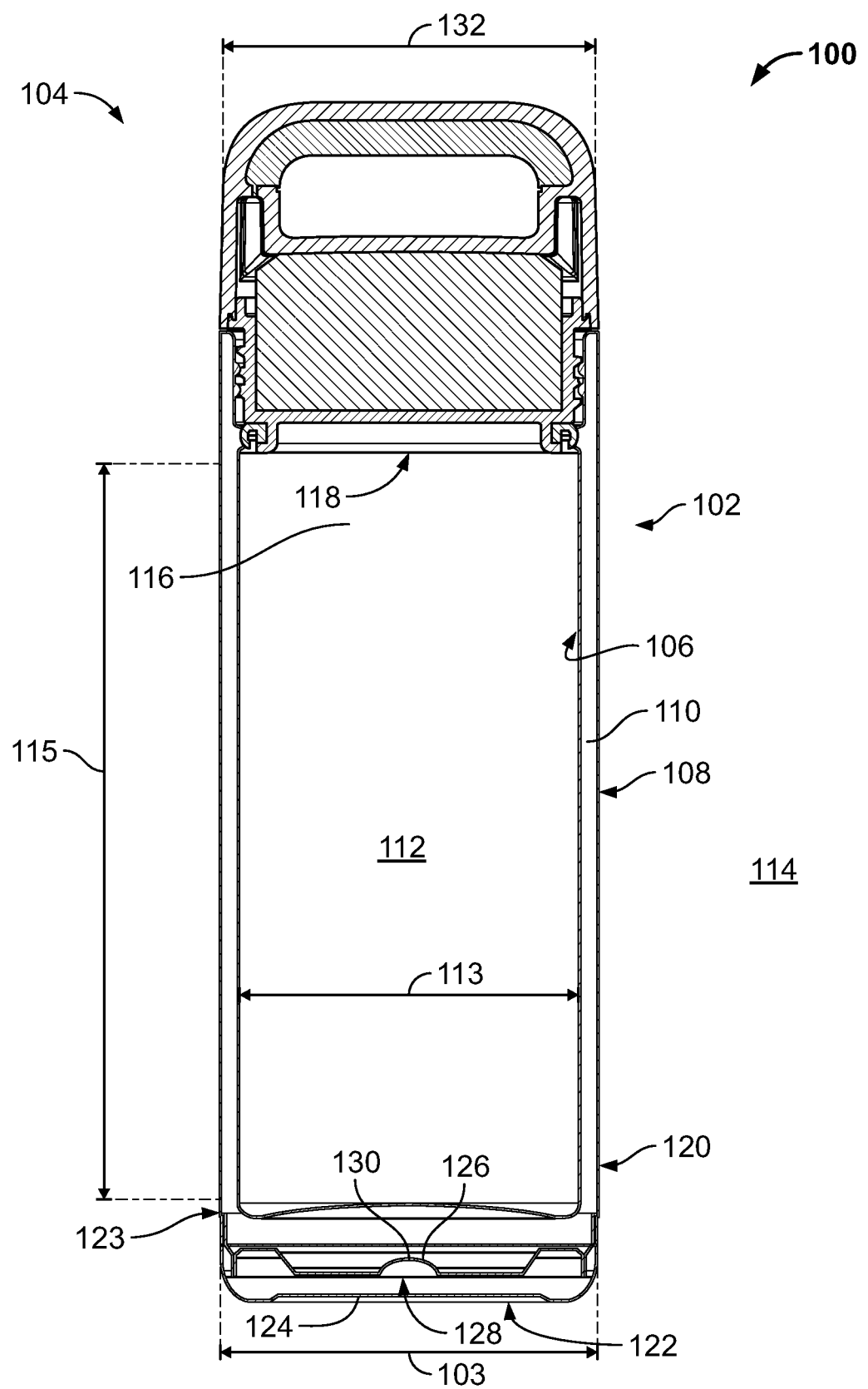
FIG. 2 depicts a cross-sectional view of the device of FIG. 1, according to one or more aspects described herein.

FIG. 2 depicts a cross-sectional view of the device 100. As such, the device 100 may include a first inner wall 106 and a second outer wall 108. A sealed vacuum cavity 110 may be formed between the first inner wall 106 and the second outer wall 108. This construction may be utilized to reduce heat transfer through the first inner wall 106 and the second outer wall 108 between a reservoir 112, which is configured to receive a mass of liquid, and an external environment 114. As such, the sealed vacuum cavity 110 between the first inner wall 106 and the second outer wall 108 may be referred to as an insulated double-wall structure. Additionally, the first inner wall 106 may have a first end 116 that defines an opening 118 extending into the internal reservoir 112 for receiving a mass of liquid. The second outer wall 108 may form an outer shell of the device 100. The second outer wall 108 may be formed of a side wall 120 and a bottom portion 122, which forms a second end 124 to support the device 100 on a surface. A seam 123 can be formed between the second outer wall 108 and the bottom portion 122. In one example, the bottom portion 122 can be press-fit onto the second outer wall 108. Additionally the bottom portion 122 can be welded to the second outer wall 108. The weld may also be polished such that the seam does not appear on the bottom of the device 100.

The bottom portion 122 may include a dimple 126 that is used during a vacuum formation process. As shown in FIG. 2, the bottom portion 122 covers the dimple 126 such that the dimple 126 is not visible to the user. The dimple 126 may generally resemble a dome shape. However, other suitable shapes are contemplated for receiving a resin material during the manufacturing process, such as a cone, or frustoconical shape. The dimple 126 may include a circular base 128 converging to an opening 130 extending into the second outer wall 108. As discussed below, the opening 130 may be sealed by a resin (not shown). During the formation of the vacuum between the first inner wall 106 and the second outer wall 108, the resin may seal the opening 130 to provide the sealed vacuum cavity 110 between the first inner wall 106 and the second outer wall 108 in formation of the insulated double-wall structure.

In alternative examples, the dimple 126 may be covered by a correspondingly-shaped disc (not shown) such that the dimple 126 is not visible to the user. The circular base 128 may be covered by a disc, which can be formed of the same material as the second outer wall 108 and the first inner wall 106. For example, the first inner wall 106, the second outer wall 108, and the disc may be formed of titanium, stainless steel, aluminum, or other metals or alloys. However, other suitable materials and methods for covering the dimple 126 are contemplated as discussed herein and as discussed in U.S. application Ser. No. 62/237,419, which is incorporated fully by reference as set forth fully herein.

As such, the container 102 may be constructed from one or more metals, alloys, polymers, ceramics, or fiber-reinforced materials. Additionally, container 102 may be constructed using one or more hot or cold working processes (e.g. stamping, casting, molding, drilling, grinding, forging, among others). In one implementation, the container 102 may be constructed using a stainless steel. In specific examples, the container 102 may be formed substantially of 304 stainless steel or a titanium alloy. Additionally, one or more cold working processes utilized to form the geometry of the container 102 may result in the container 102 being magnetic (may be attracted to a magnet).

In one example, the reservoir 112 of the container 102 may have an internal volume of 532 ml (18 fl. oz.). In another example, the reservoir 112 may have an internal volume ranging between 500 and 550 ml (16.9 and 18.6 fl. oz.). In yet another example, the reservoir 112 may have an internal volume of at least 100 ml (3.4 fl. oz.), at least 150 ml (5.1 fl. oz.), at least 200 ml (6.8 fl. oz.), at least 400 ml (13.5 fl. oz.), at least 500 ml (16.9 fl. oz.), or at least 1000 ml (33.8 fl. oz.). The opening 118 in the container 102 may have an opening diameter of 64.8 mm. In another implementation, the opening 118 may have an opening diameter at or between 60 and/or 70 mm. The reservoir 112 may have an internal diameter 113 and a height 115 configured to receive a standard-size 355 ml (12 fl. oz.) beverage (aluminum) can (standard 355 ml beverage can with an external diameter of approximately 66 mm and a height of approximately 122.7 mm). Accordingly, the internal diameter 113 may measure at least 66 mm and can be at or between 50 mm and/or 80 mm. The height 115 may measure at least 122.7 mm and can be at or between 110 mm and/or 140 mm. In one example, the container 102 may have an outer diameter 103 measuring approximately 76.2 mm. In other examples, the outer diameter 103 may be at between 60 and/or 90 mm. Further, the lid 102 may have an outer diameter 132 approximately equal to the outer diameter 103 of the container 102.

Additional or alternative methods of insulating the device 100 are also contemplated. For example, the cavity 110 between the first inner wall 106 and the outer walls 108 may be filled with various insulating materials that exhibit low thermal conductivity. As such, the cavity 110 may, in certain examples, be filled, or partially filled, with air to form air pockets for insulation or a mass of material such as a polymer material, or a polymer foam material. In one specific example, the cavity 110 may be filled, or partially filled, with an insulating foam, such as polystyrene. However, additional or alternative insulating materials may be utilized to fill, or partially fill, the cavity 110, without departing from the scope of these disclosures.

Moreover, a thickness of the cavity 110 may be embodied with any dimensional value, without departing from the scope of these disclosures. Also, an inner surface of one or more of the first inner wall 106 or the second outer wall 108 of the device 100 may comprise a silvered surface, copper plated, or covered with thin aluminum foil configured to reduce heat transfer by radiation. It is also contemplated that the lid 104 may be insulated using the techniques described herein.

Figure 3:
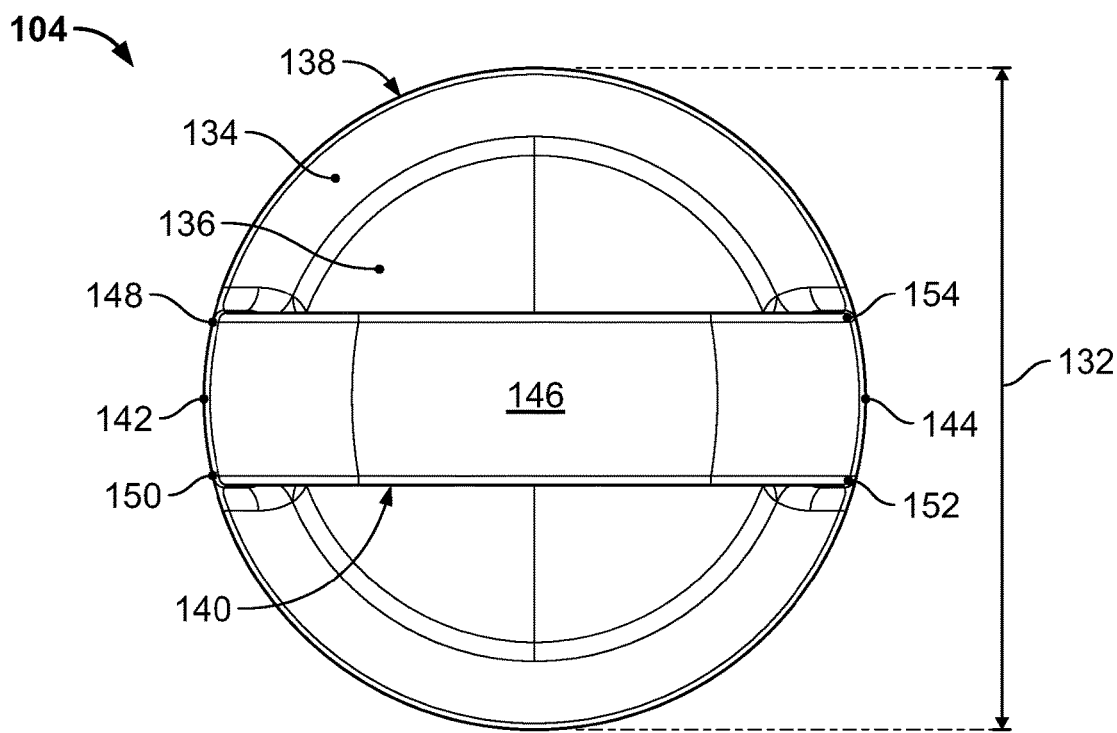
FIG. 3 depicts a top view of a lid of the insulating device of FIG. 1, according to one or more aspects described herein.

As depicted in FIG. 2, the lid 104 may be configured to be removably-coupled to, and seal the opening 118 in the container 102. FIG. 3 depicts a top view of the lid 104 with an outer diameter 132. In one example, outer diameter 132 may measure approximately 75.8 mm. In another example, outer diameter 132 may measure at or between approximately 60 and/or 90 mm. However, outer diameter 132 may be embodied with any dimensional value without departing from these disclosures. The lid 104 may be formed as a frustoconical surface 134 spaced between a circular top surface 136 and a cylindrical surface 138. A handle 140 may be integrally-molded to the frustoconical surface 134, and coupled to the lid 104 at two diametrically-opposed points 142 and 144. In one example, the handle 140 may have an outer surface 146, with at least a portion of the outer surface 146 having circular curvature concentric with, and having a radius equal to, the cylindrical surface 138. For example, the circular curvature of the outer surface 146 may be concentric with, and have a radius equal to the cylindrical surface 138 between points 148 and 150, and also between points 152 and 154. Accordingly, this portion of the outer surface 146 of the handle 140 may have a radius of curvature equal to 37.9 mm. In another example, this portion of the outer surface 146 the handle 140 may have a radius of curvature measuring at or between 30 and/or 45 mm. However, this radius of curvature of the handle 140 may have any dimensional value, without departing from the scope of these disclosures.

Figure 4:
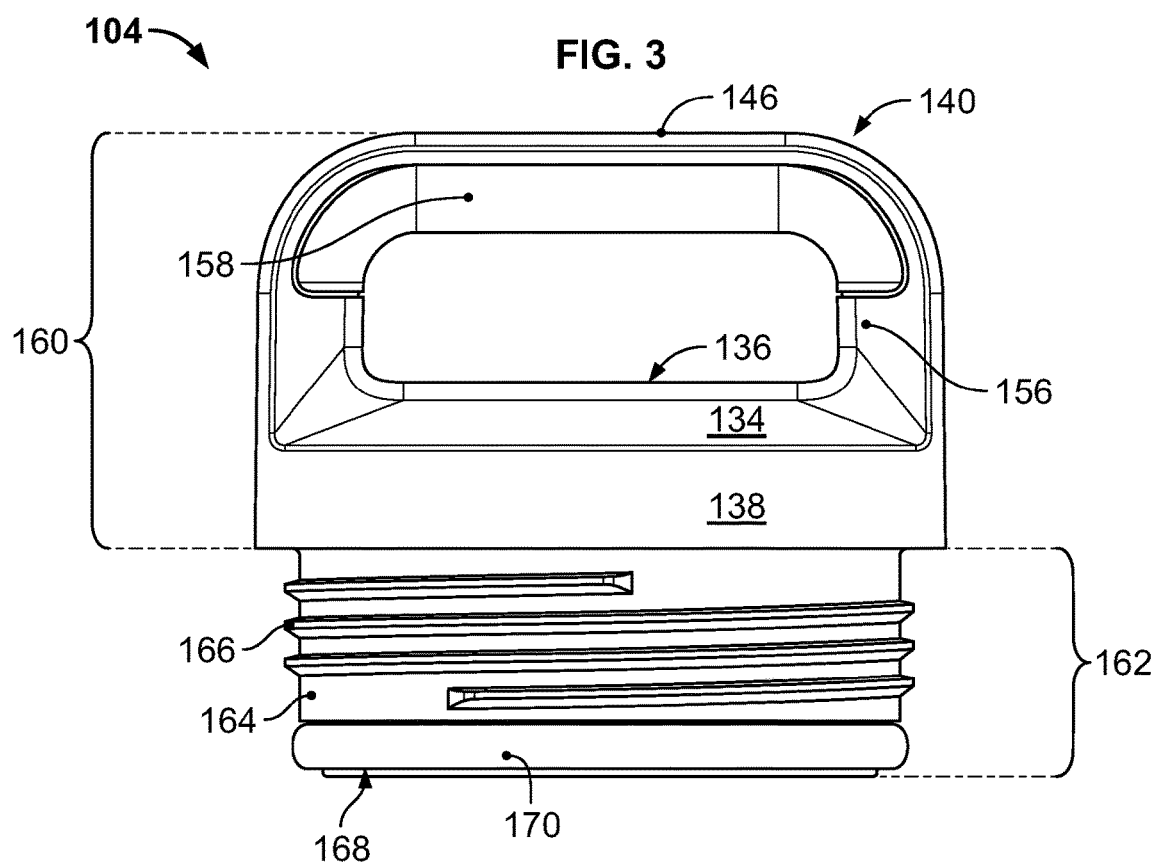
FIG. 4 depicts an elevation view of the lid of FIG. 3, according to one or more aspects described herein.

FIG. 4 depicts an front view of the lid 104. Accordingly, the handle 140 may have an inner surface 156 that has an overmolded grip 158. In one implementation, the overmolded grip 158 may be an elastomer, such as silicone rubber. However, any polymer may be utilized as the overmolded grip 158. Further, in another implementation, the inner surface 156 of the handle 140 may not include the grip 158, without departing from these disclosures. In one example, the cylindrical surface 138, the frustoconical surface 134, the circular top surface 136, and the handle 140 may be collectively referred to as an upper portion 160 of the lid 104. The lid 104 may have a lower portion 162 that has a cylindrical sidewall 164 with a threaded area 166 and a channel 168 extending around a lower area of the sidewall 164. The channel 168 may be configured to retain a gasket 170. In one example, a radially and axially extending flange 161 can extend from the lower portion 162 of the lid 104. The radially extending portion of the flange 163 in combination with a shoulder 165 forms the channel 168 for receiving the gasket 170. The hollow structure of the flange provides additional volume for the contents in the device. However, it is also contemplated that the channel could be formed as a reduced diameter portion in the lid 104 such that the reduced diameter portion is a solid non-hollow structure. In one example, the gasket 170 may be a c-shaped or u-shaped gasket as shown in FIG. 5. However, different gasket geometries are contemplated in this disclosure. Additionally it is also contemplated that the gasket 170 could be placed at other locations along the lid 104. For example, the gasket 170 can be placed between the upper portion 160 and the lower portion 162 at the ridge formed by the upper portion 160 or in a middle area on the lower portion 162 to aid in sealing the container. Moreover, the gasket 170 could be omitted entirely.

FIG. 5 schematically depicts a cross-sectional view of the lid 104. In one implementation the lid 104 may be formed using a three-shot molding process, whereby the upper portion 160 may be injection molded with a first shot of polymer material. Further, the grip 158 may be overmolded onto the upper portion 160. Further, the lower portion 162 may be injection molded with a second shot of polymer material. The upper portion 160 may be rigidly-coupled to the lower portion 162 by a third shot of a polymer material at the interface 172 between the upper portion 160 and lower portion 162. This third shot of polymer material is schematically depicted in FIG. 5 as polymer interface element 173. In this way, polymer interface element 173 acts like a weld seam to join the upper portion 160 to the lower potion 162. This three-shot injection molding process may utilize three different polymer materials (one for each of the upper portion 160, lower portion 162, and polymer interface element 173). In another example, the three-shot injection molding process may utilize a same polymer material for the upper portion 160 and lower portion 162, and a different polymer material for the polymer interface element 173. In yet another example, the three-shot injection molding process may utilize a same polymer material for the upper portion 160, the lower portion 162, and the polymer interface element 173.

In other implementations, the lid 104 may be formed using additional or alternative forming processes. For example, the upper portion 160 may be formed by a first molding process (injection molding or otherwise) of a polymer material, and the lower portion 162 may be formed by a second molding process of a polymer material. Subsequently, the upper portion 160 may be coupled to the lower portion 162 by an alternative coupling process, such as, among others, spin welding, gluing, ultrasonic welding, an interference fit, a threaded coupling, or use of one or more fasteners (such as rivets, screws or bolts) or combinations thereof. It is also contemplated that the lid 104 can be formed by a single injection molding process. In various implementations, the lid 104 may be formed of a single, or multiple polymer materials, including, among others, Acrylonitrile Butadiene Styrene, polypropylene, polyethylene, polystyrene, polyvinyl chloride, nylon, polycarbonate or acrylic, or combinations thereof. Once coupled to one another, a sealed cavity 174 may be formed between the upper portion 160 and the lower portion 162.

The handle 140 may have an opening 176 that is configured to receive one or more fingers of the user. In one implementation, the opening 176 may have a height 178 and a width 180. In one example, the height 178 may measure 16.1 mm. In another example, the height 178 may measure at or between 10 and/or 20 mm. Further, the width 180 may measure 45 mm. In other examples, the width 180 may measure at or between 40 and/or 60 mm. As such, the opening 176 may have an opening area measuring between 400 and 1200 mm². In one example, the opening 176 may be configured to receive at least two fingers of an average-sized adult hand. In another example, the opening 176 may be configured to receive at least three fingers of an average-sized adult hand.

FIG. 6 depicts an enlarged cross-sectional view of the lid 104 removably coupled to the container 102. In particular, FIG. 6 depicts the upper threaded area 166 of the cylindrical sidewall 164 of the lid 104 received by a threaded sidewall 182 of the first inner wall 106 of the container 102. Engagement between the upper threaded area 166 and the threaded sidewall 182 seals the opening 118 at the first end 116 of the container 102 by urging the gasket 170 into contact with a lip structure 184 extending from the first inner wall 106 of the container 102. As such, the lip structure 184 is configured to compress the gasket 170 to seal the opening 118. In one example, the lid 104 may be removably-coupled to the container 102 by engaging the threaded sidewall 182 with the threaded area 166 of the cylindrical sidewall 164. As such, the lid 104 may be fully engaged with the container 102 upon rotation of the lid 104 relative to the container 102 by any number of revolutions, or by any fraction of a revolution. For example, the lid 104 may be fully engaged with the container 102 upon rotating the lid 104, and hence, engaging the threaded area 166 of the cylindrical sidewall 164 with the threaded sidewall 182, by approximately ¼ of one full revolution, approximately ⅓ of one full revolution, approximately ½ of one full revolution, approximately 1 full revolution, approximately 2 full revolutions, approximately 3 full revolutions, at least 1 revolution, or at least five revolutions, among many others.

The cavity 174 may be configured to receive a mass of insulating material, such as a foam insert. This foam insert may, in one example, be polystyrene. However, additional insulating materials may be utilized with the disclosures described herein. In one implementation, the cavity 174 may be a vacuum cavity. In another example, the cavity 174 may be configured to receive a vacuum-insulated puck structure 186, as schematically depicted in FIG. 7. In one implementation, the vacuum-insulated puck may be in-molded into the cavity 174. Accordingly, the vacuum-insulated puck 186 may have a substantially cylindrical shape, and may be configured with a vacuum cavity (not depicted) configured to reduce heat transfer along an axial direction 188, and/or a radial direction 190. In certain examples, the vacuum-insulated puck 186 may be constructed from a metal or alloy, such as stainless steel. In other examples, the vacuum-insulated puck 186 may be constructed from a polymer, a ceramic, or a fiber-reinforced material, or combinations thereof. Further, the vacuum-insulated puck 186 may have any width 192 and/or height 194 dimensional values, without departing from the scope of these disclosures. In certain examples, the vacuum-insulated puck 186 may have a substantially cylindrical shape, but may have chamfered and/or filleted edges. In another example, the vacuum insulated puck 186 may have a shape configured to complement the shape of the lid 104 such that it has a cylindrical surface corresponding to the cylindrical surface 138, a frustoconical surface corresponding to the frustoconical surface 134, and a circular top surface corresponding to the circular top surface 136.

Figure 8:
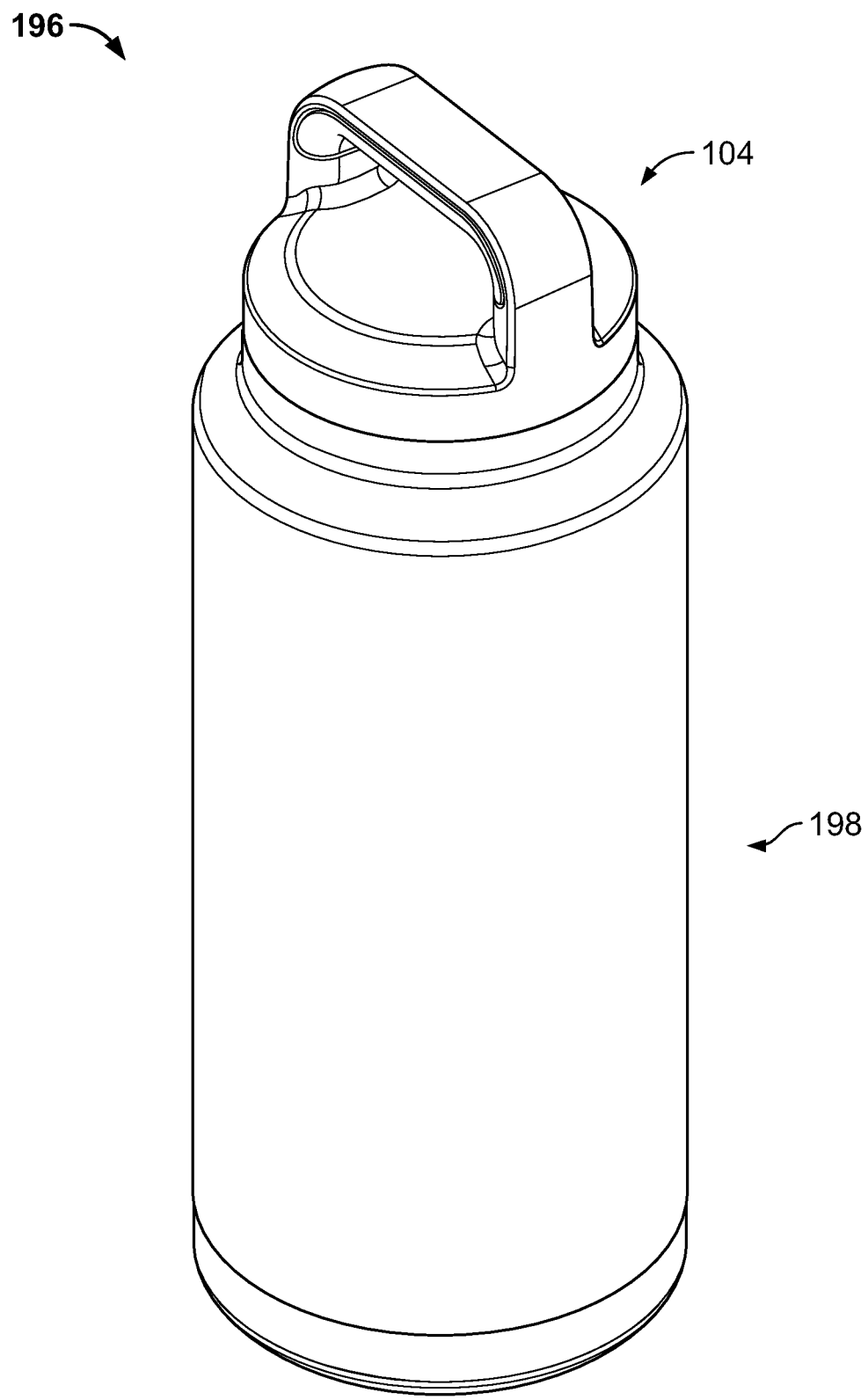
FIG. 8 depicts an isometric view of another example insulating device, according to one or more aspects described herein.
Figure 9:
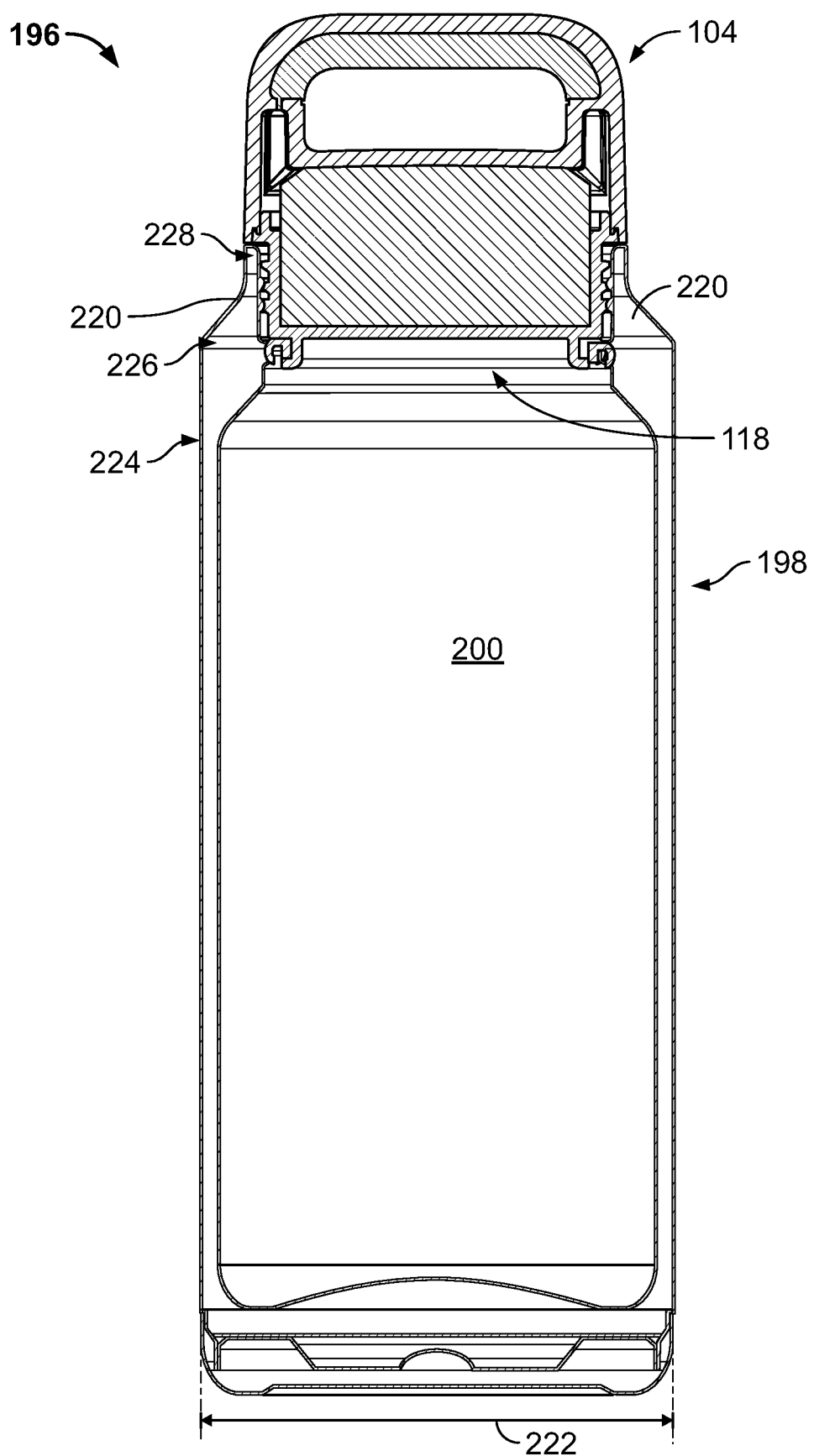
FIG. 9 depicts a cross-sectional view of the device of FIG. 8, according to one or more aspects described herein.

FIG. 8 depicts an isometric view of another device 196. Similar to device 100, device 196 utilizes lid 104, but may be embodied with a container 198 having a larger internal reservoir volume than container 102. FIG. 9 depicts a cross-sectional view of device 196. The reservoir 200 may have a volume of approximately 36 fl. oz. (approximately 1064 ml). However, the container 198 may utilize the same opening 118 as the container 102 in order to facilitate removable-coupling to the lid 104. In one example, the container 198 comprises a shoulder region 220.

As such, container 198 may have an outer diameter 222 greater than diameter 132 of lid 104. Accordingly, an outer wall 224 of the container 198 may taper between points 226 and 228 along a shoulder region 220. In one example, the shoulder region 220 may improve heat transfer performance of the container 198 (reduce a rate of heat transfer) when compared to a container 102. In particular, the shoulder region 220 may comprise insulation having lower thermal conductivity (higher thermal resistance/ insulation) than the lid 104 that seals the opening 118. As such, device 196 having outer diameter 222 greater than a diameter of the opening 118 provides for an increased surface area having the comparatively higher performance insulation (lower thermal conductivity insulation).

Figure 10:
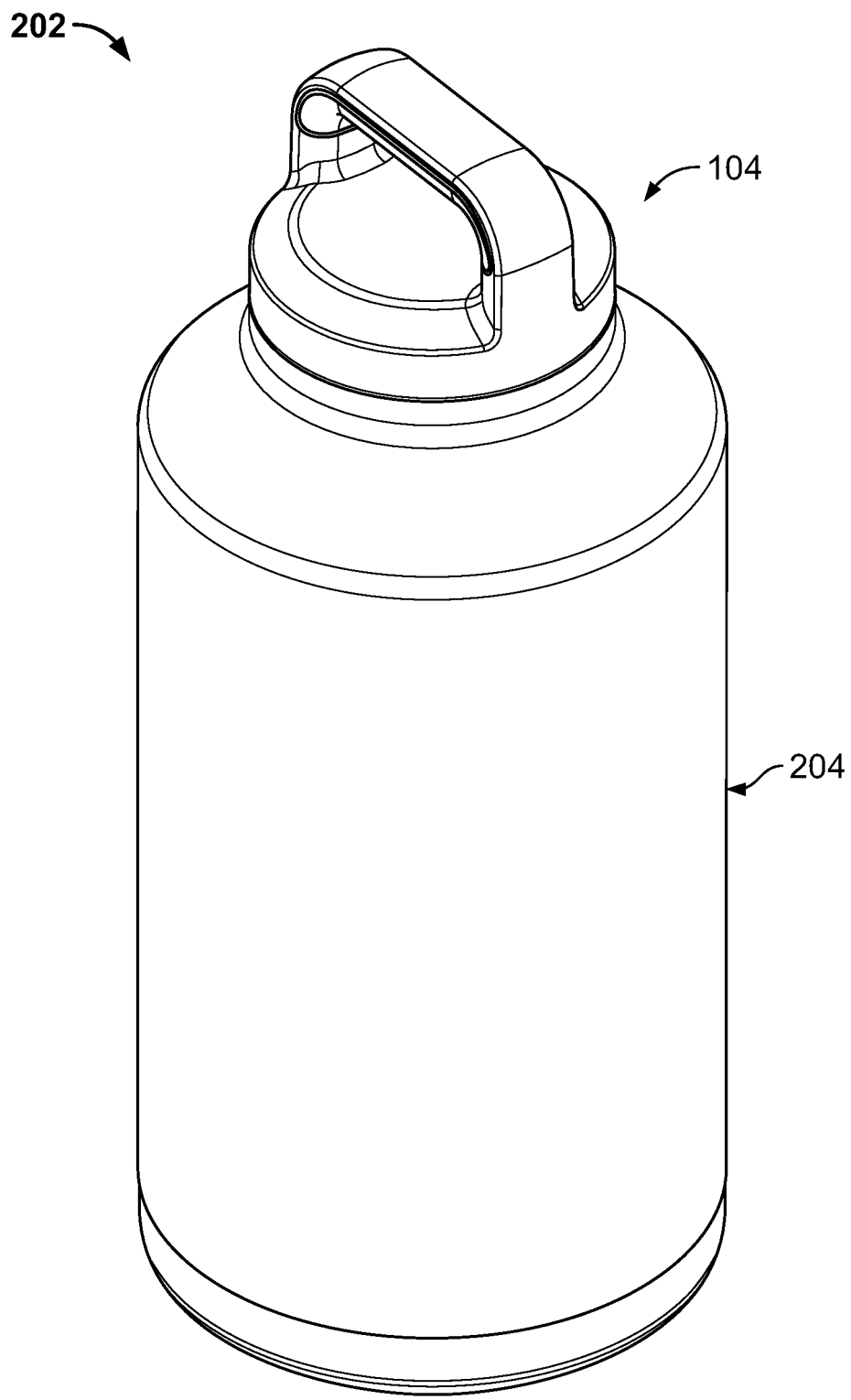
FIG. 10 depicts an isometric view of yet another example insulating device, according to one or more aspects described herein.
Figure 11:
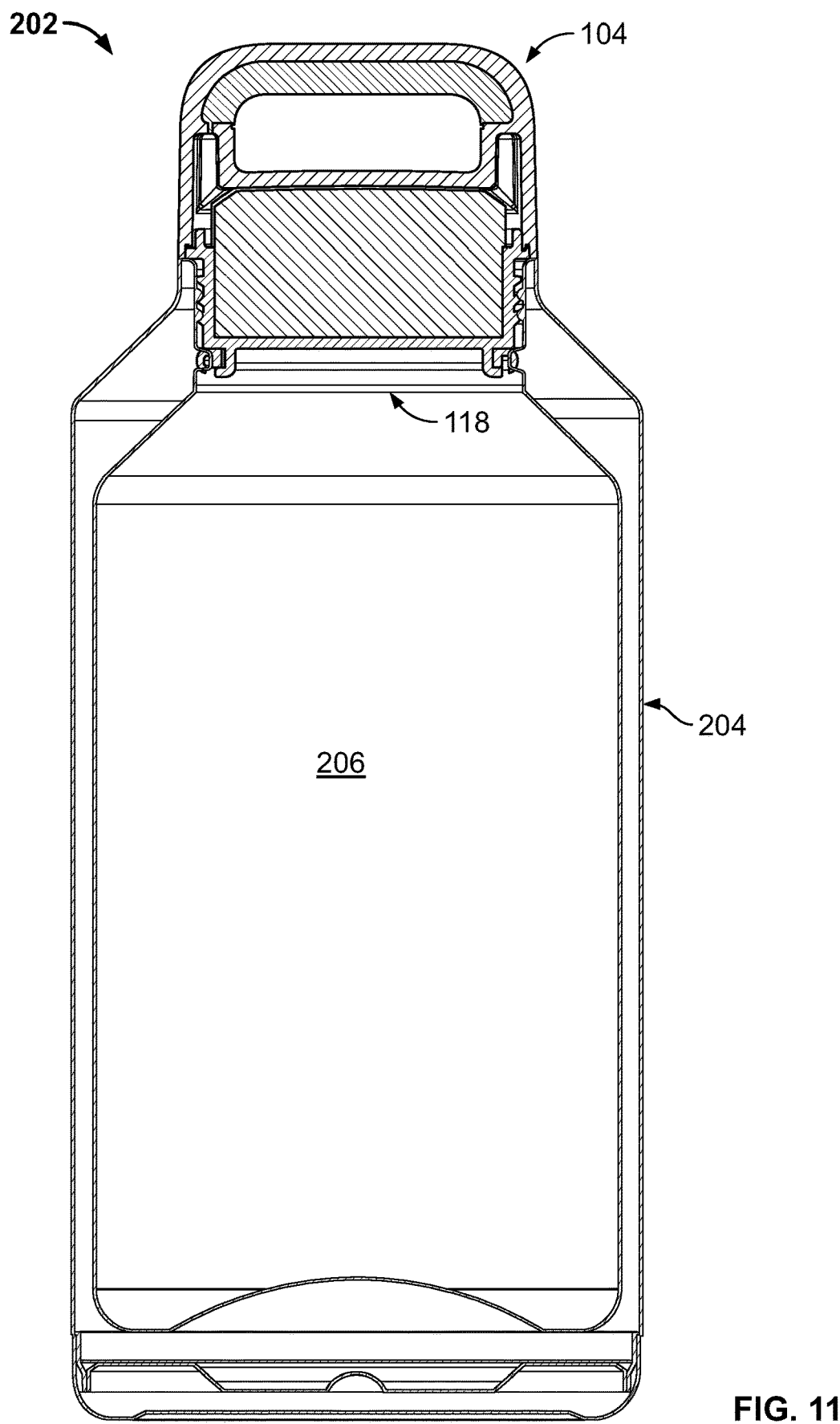
FIG. 11 depicts a cross-sectional view of the device of FIG. 10, according to one or more aspects described herein.

FIG. 10 depicts an isometric view of another insulating device 202. Again, device 202 may utilize lid 104, but may be embodied with a container 204 that has a larger internal reservoir volume than container 102, and container 198. FIG. 11 depicts a cross-sectional view of the device 202. In one example, the reservoir 206 may have a volume of approximately 64 fl. oz. (approximately 1893 ml). However, the container 204 may utilize the same opening 118 as the container 102 in order to facilitate removable coupling to the lid 104.

Figure 12A:
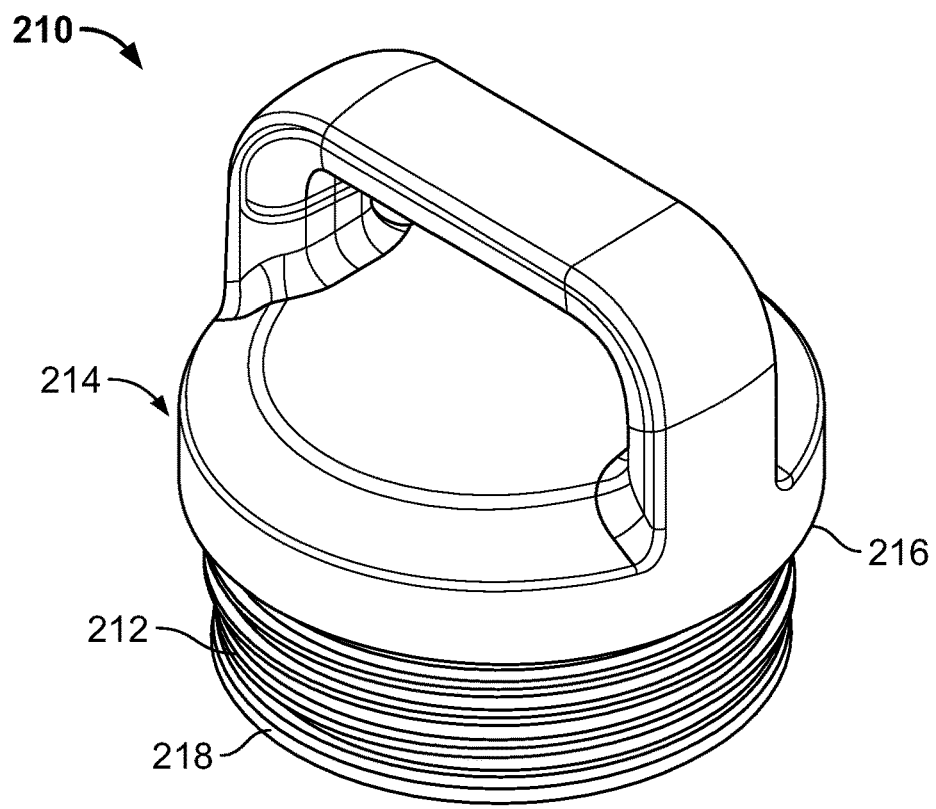
FIGS. 12-12F depict another implementation of a lid structure, according to one or more aspects described herein.
Figure 12B:
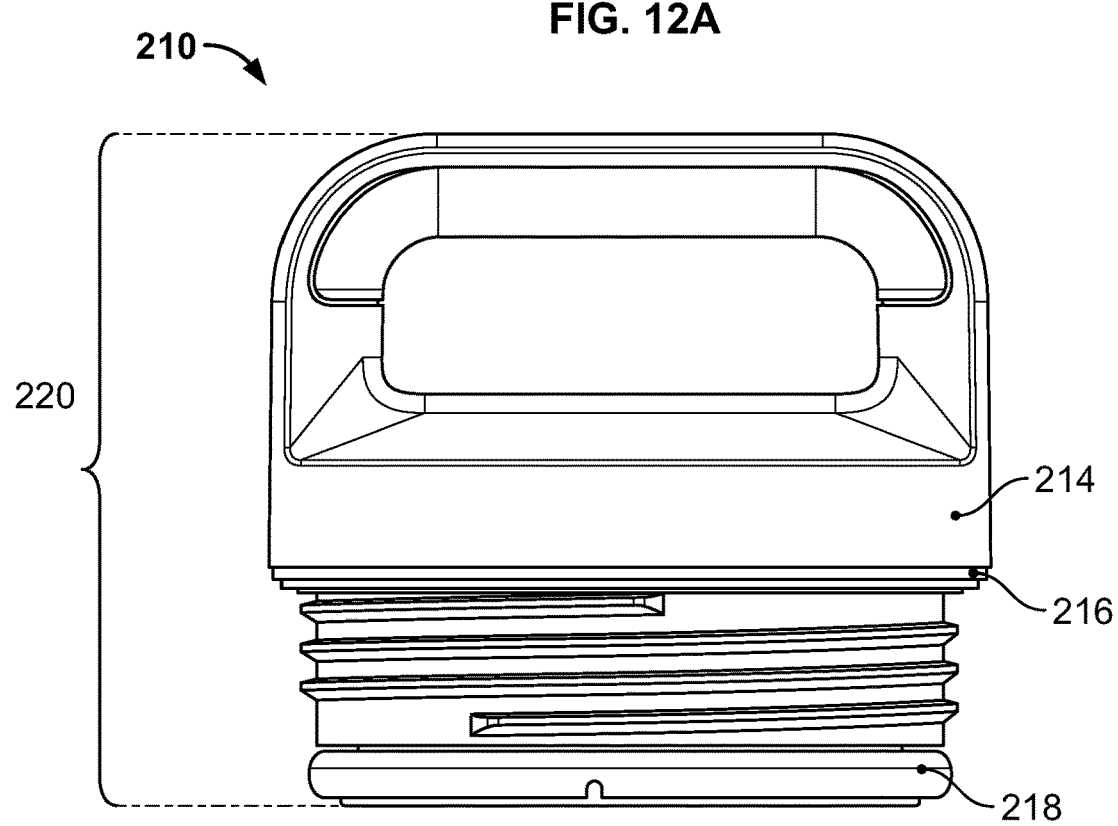

FIG. 12A depicts an isometric view another implementation of a lid 210. The lid 210 may be similar to lid 104, and may be configured to be removably-coupled to the container 102. The lid 210 may be embodied with a threaded structure 212 that may interface with the threaded sidewall 182 of the first inner wall 106 of the container 102 in order to removably-couple the lid 210 to the container 102. Lid 210 may also comprise an upper portion 214 that may be implemented with geometrical features similar to those described in relation to upper portion 160 of the lid 104. The lid 210 may also include an upper gasket structure 216 and a lower gasket structure 218. The upper gasket structure 216 may be configured to be compressed between the upper portion 214 and the top of the container 102. The upper gasket structure 216 may be embodied as an o-ring gasket structure comprising one or more polymeric materials. Further, the upper gasket structure 216 may be embodied with any dimensional values (e.g. inner diameter, outer diameter, and/or height), without departing from the scope of these disclosures. The lower gasket structure 218 may be configured to seal the opening 118 by compressing against the lip structure 184 of the container 102. FIG. 12B depicts an elevation view of the lid 210. It is contemplated that the lid 210 may be embodied with any dimensional values, without departing from the scope of these disclosures. In one example, the height 220 of the lid 210 may measure approximately 70.5 mm. In another implementation, the height 220 may range between 60 mm or less and 80 mm or more, without departing from the scope of these disclosures.

Figure 12E:
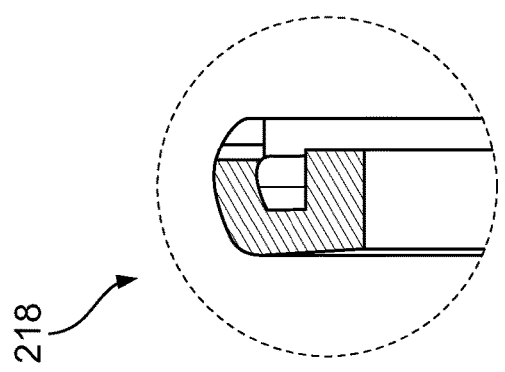
Figure 12D:
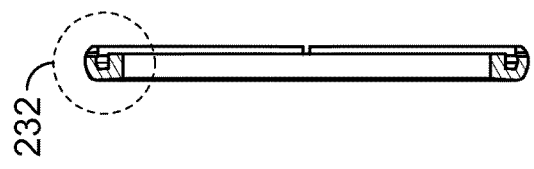
Figure 12C:
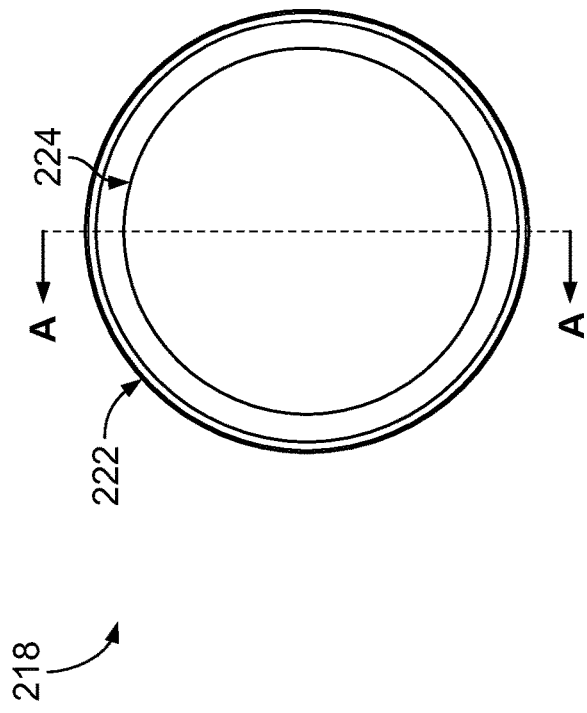
Figure 12F:
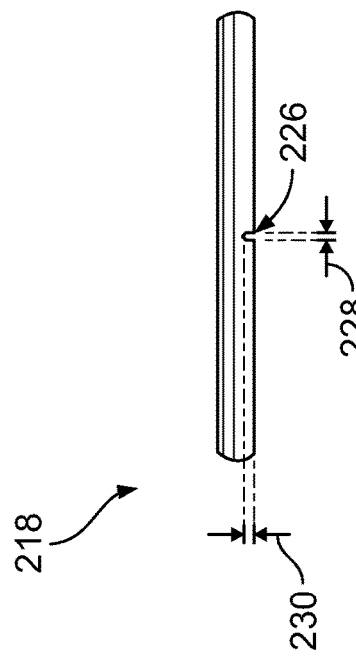

FIG. 12C depicts a top view of the lower gasket structure 218. In one implementation, the lower gasket structure 218 may have an outer diameter 222 and an inner diameter 224. Is contemplated that the outer diameter 222 and the inner diameter 224 may be implemented with any dimensions, without departing from the scope of these disclosures. In one specific implementation, the outer diameter 222 may measure 61.8 mm. In another example, the outer diameter 222 may range between 50 mm or less and 70 mm or more. Further, the inner diameter 224 may measure 51.2 mm. In another example, the inner diameter 224 may range between 40 mm or less and 60 mm or more, without departing from the scope of these disclosures. FIG. 12D depicts an elevation view of the lower gasket structure 218. Accordingly, the lower gasket structure 218 may be embodied with one or more radially-extending vent structures 226. The vent structure 226 may be utilized to allow internal pressure within the reservoir 112 be released. In one example, the vent structure 226 may allow a gas pressure within the reservoir 112 to be lowered by allowing a portion of gas to escape through the threaded interface between structures 182 and 212, while preventing a liquid stored in the reservoir 112 from leaking. In one specific example, the lower gasket structure 218 may be embodied with four radially-extending vent structures 226, equally spaced around the circumference of the lower gasket structure 218. It is further contemplated that the lower gasket structure 218 may be embodied with a single vent structure 226, or with two, three, or more than four vent structures 226, without departing from the scope of these disclosures. In one specific example, a vent structure 226 may comprise an opening having a height 230 that may measure 1.5 mm, and a width 228, that may measure 1 mm. It is contemplated, however, that the width 228 and height 230 may be embodied with any dimensional values, without departing from the scope of these disclosures. FIG. 12 D depicts a cross-sectional view of the lower gasket structure 218 along line A-A from FIG. 12C. FIG. 12E schematically depicts a more detailed view of the elements within area 232 in FIG. 12D. Accordingly, FIG. 12E schematically depicts a compressible geometry of the gasket structure 218. In one implementation, the lower gasket structure 280 may comprise a c-shaped or u-shaped gasket geometry. Further the gasket structure 218 may be formed from one or more compressible, polymeric materials. In one specific example, the lower gasket structure 280 may have a 30 durometer hardness value. However, it is contemplated that the lower gasket structure 218 may be embodied with different hardness values, without departing from the scope of these disclosures.

FIGS. 13-13E and 14A-I depict another example lid 304 that can be used in conjunction with the containers discussed herein as well as other container types. The example lid 304 can be configured to have "flip" type of closure such that the lid 304 can be selectably opened or closed by the user by rotating a flip closure 307 into either the opened position (shown in FIG. 13) or the closed position (shown in FIG. 13A1). In this way, the flip closure 307 can selectively seal an opening 305 of the lid 304 to maintain the contents of the container therein during transport or storage of the container.

Figure 13B:
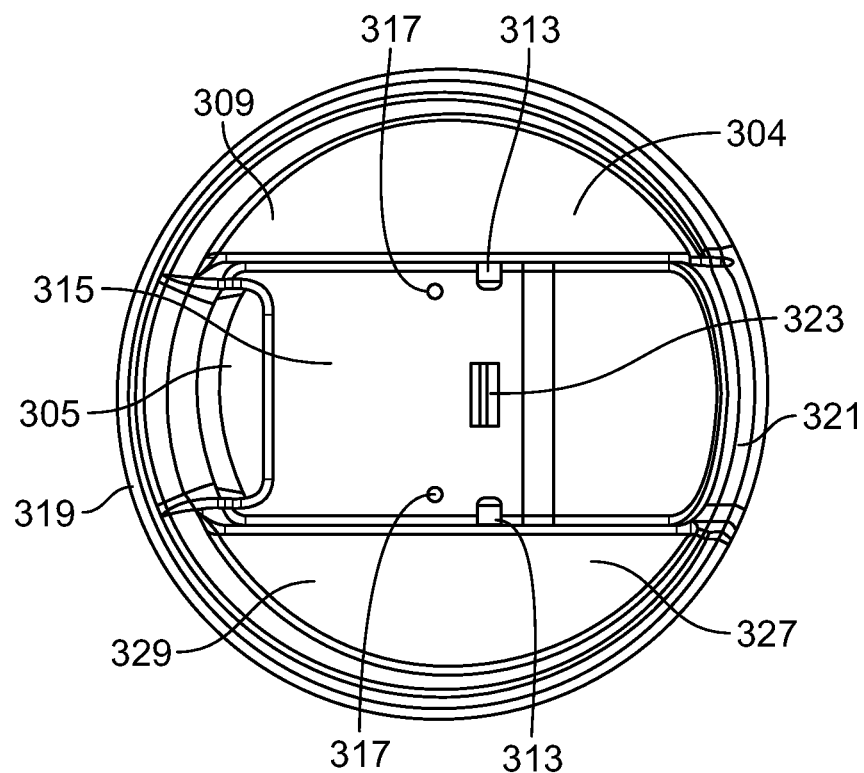
FIG. 13B shows a side view of the example lid of FIG. 13A2.
Figure 13B:
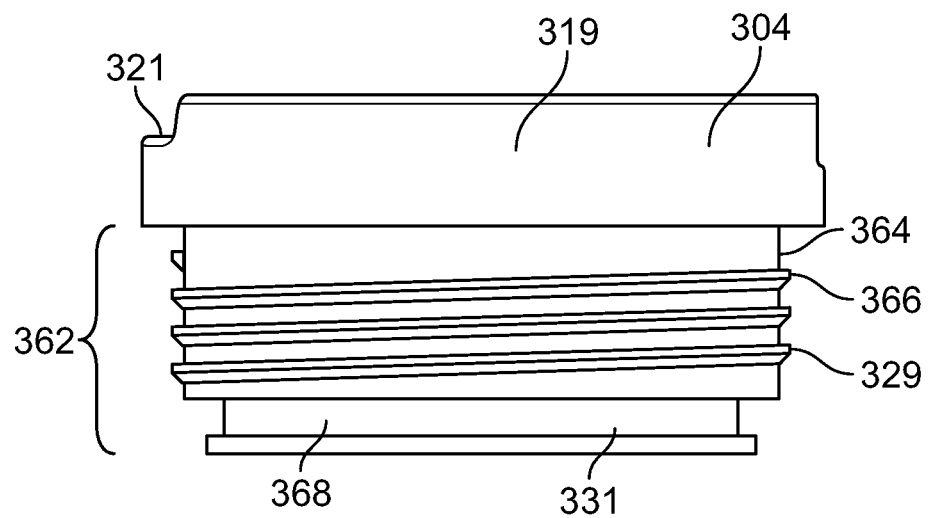
Figure 13D:
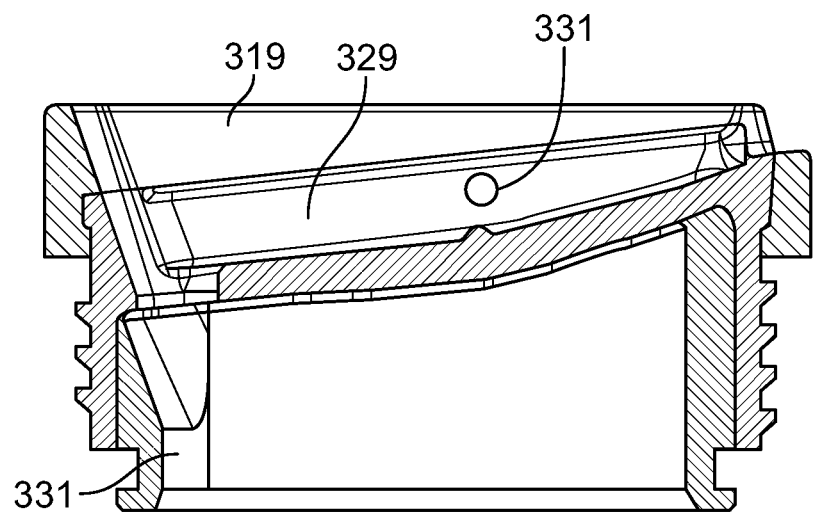
FIG. 13D shows a cross-sectional view of the example lid of FIG. 13A2.
Figure 13E:
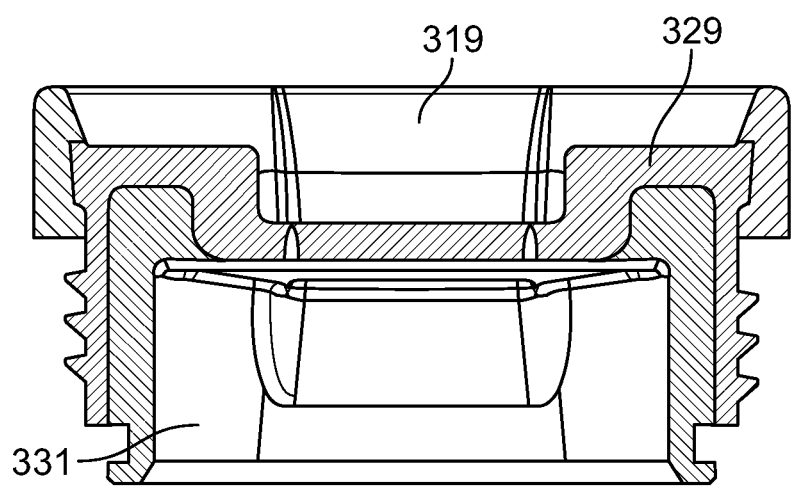
FIG. 13E shows another cross-sectional view of the example lid of FIG. 13A2.

As shown in FIG. 13-13E, the lid 304 can generally include a lid body 327 having a top wall 309 and a side wall 364 configured to secure the lid 304 to a container, which in this example can be a threaded area 366. The top wall 309 can include an opening 305 for pouring the contents out of the container. The lid 304 may also include a flip closure 307, which will be discussed in relation to FIGS. 14A-16D, for selectively sealing or opening the lid 304. The lid body 327 can be formed of a rim 319, an outer cap 329, and an inner cap 331 in a three-shot molding process, which will be discussed in further detail below.

Also, as shown in FIG. 13B, similar to the example lid 104 discussed above, the lid 304 may have a lower portion 362, which can be formed of portions of the outer cap 329 and the inner cap 331. The lower portion 362 has a cylindrical sidewall 364 and comprises the threaded area 366 for threading into the container, and a channel 368 extending around a lower area of the sidewall 364. The channel 368 may be configured to retain a lower gasket (not shown). The lower gasket can be formed like the gaskets discussed above, and, as discussed herein, an additional upper gasket can be placed below the rim 319 above the threaded area 366 to provide for additional sealing properties.

Referring again to FIGS. 13-13A2, the top wall 309 can be provided with a central channel 315 which comprises the opening 305 and the flip closure 307. The flip closure 307 pivots on a pair of pins 313 that extend from the central channel 315 located in the top wall 309. The central channel 315 may also include two ports 317 that serve as air inlets to ease the pouring of the contents from the container. The channel 315 may also include a slot 323 for receiving a corresponding cam 325 on the flip closure 319. The interaction of the cam 325 and the slot 323 helps to maintain the flip closure 307 in the opened position when the user consumes the contents of the container. In addition, the rim 319 can include a cutout portion or a notch 321, which is configured to receive the flip closure 307 when the flip closure 307 is in the opened position. Specifically, the cutout portion 321 on the rim 319 can be configured to receive the upwardly and outwardly extending tab 335 from the flip closure 307 when the flip closure 307 is in the opened position.

Like in the above example, the lid body 327 can also be formed by a three-shot molding process, where the outer cap 329 can be formed first, the inner cap 331 can be formed inside of the outer cap 329, and the rim 319 can be formed on top of the outer cap 329. In one example, each of the outer cap 329, the inner cap 331, and the outer cap 329 can all be formed of the same material, such as a suitable polymer, which includes the polymer types discussed herein. However, the outer cap 329 can be formed clear or opaque such that the user can see the beverage through the top of the lid 304. However, it is also contemplated that the outer cap 329 can be formed of a non-transparent material, the rim 319 and the inner cap 331 can be formed of a transparent material, or each of the outer cap 329, inner cap 331, and the rim 319 be formed of a transparent or non-transparent material. Furthermore, it is also contemplated that the lid body 327 be formed as a single shot of clear, semi-transparent, or non-transparent material. Also, during the formation of the outer cap 329, the pins 313 can be inmolded into the channel 315 to provide a pivot and location for the flip lid 307.

Figure 14A:
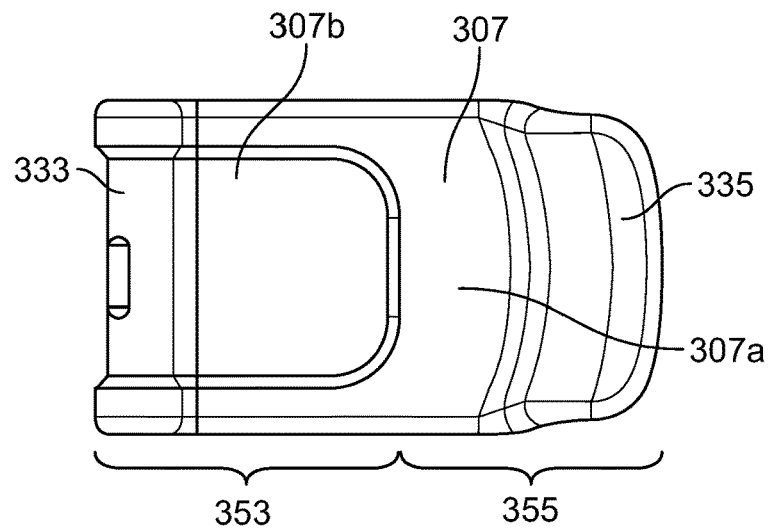
FIG. 14A shows a top view of an example flip closure.
Figure 14B:
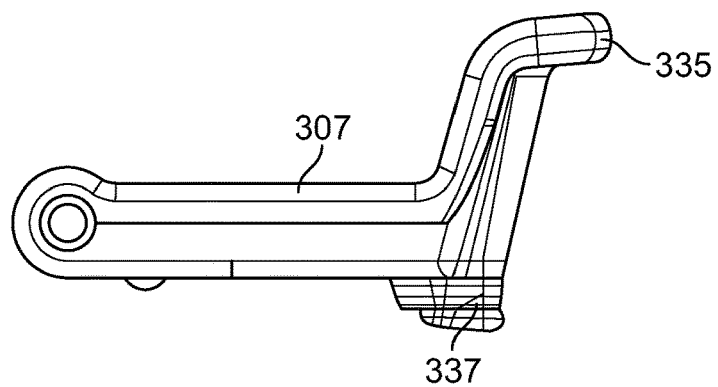
FIG. 14B shows a side view of the example flip closure of FIG. 14A.
Figure 14C:
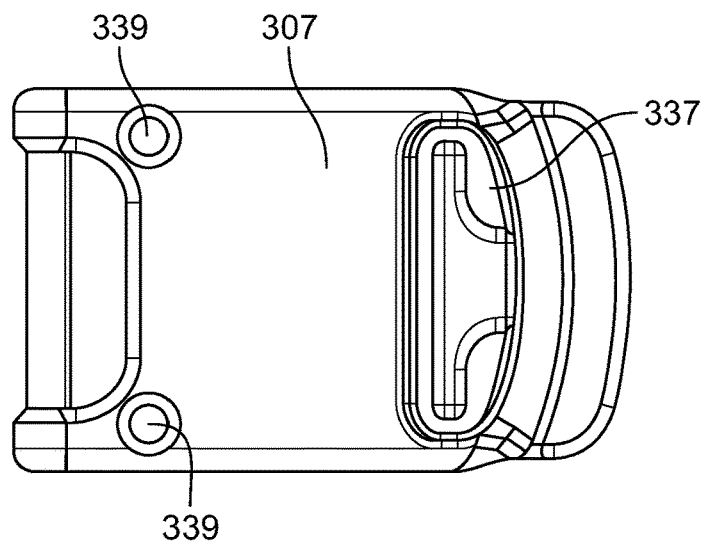
FIG. 14C shows a bottom view of the example flip closure of FIG. 14A.
Figure 14D:
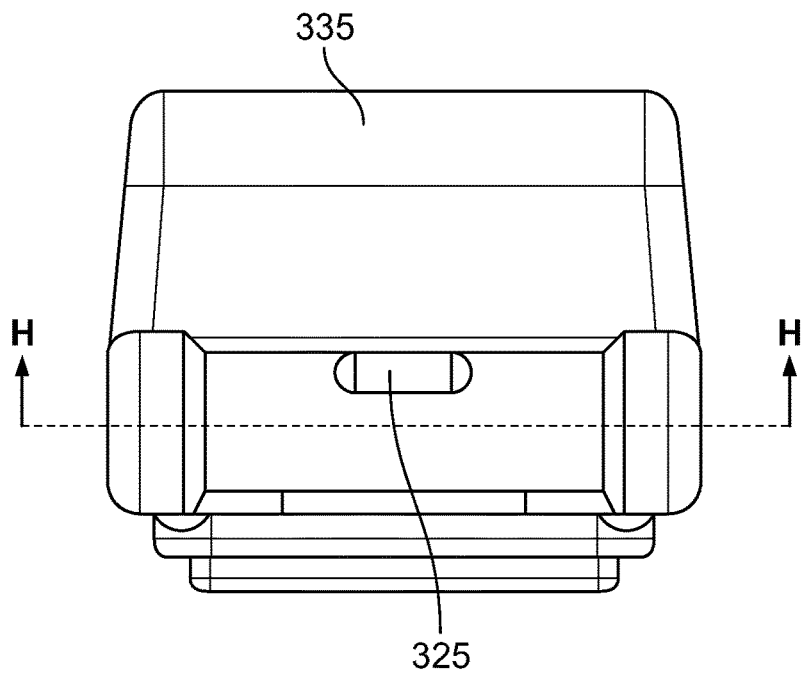
FIG. 14D shows a rear view of the example flip closure of FIG. 14A.
Figure 14E:
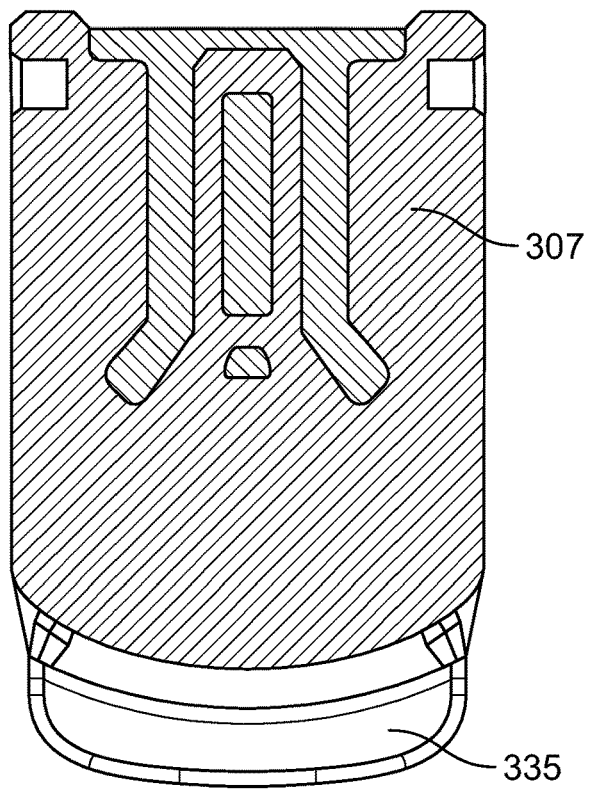
FIG. 14E shows a cross-sectional view of the example flip closure of FIG. 14A.

Referring now to FIGS. 14A-14G1, the flip closure 307 is shown in further detail. The flip closure 307 may include a knuckle 333 configured to articulate on the pins 313 of the lid body 327, an upwardly and outwardly extending tab 335 for grasping by the user to articulate the flip closure, and a stopper 337 for sealing the opening 305 of the lid 304. The flip closure 307 can be formed of a first section 307a and a second section 307b, which can be formed of different materials to provide adequate sealing properties and to assist in the assembly of the flip closure 307 to the lid 304. The flip closure 307 can also include two protuberances 339, which are configured to align with the ports 317 when the flip closure 307 is in the closed position. Additionally, the flip closure 307 includes a cam 325 for aligning with the slot 323 in the channel 315 to secure the flip closure 307 in the opened position. Together the knuckle 333, slots 343 formed therein, and the pins 313 form a hinge for the flip closure 307 to articulate between the closed position and the opened position. An example pin 313 is shown in further detail in FIG. 13C1. As shown in FIG. 13C1, the pin 313 can include a first smooth surface 313a and a second textured surface 313b, which in one example can be a diamond knurled surface 313b. The first smooth surface 313a is configured to receive the slots 343 of the knuckle 333 to provide a smooth operation or rotation of the hinge between the lid body 327 and the flip closure 307. The second surface 313b is configured to be received in the channel 315 of the lid body 327 and provides a textured surface that can be received in the channel 315 during the formation of the outer cap.

In one example, the flip closure 307 can be overmolded with a rubber material, which provides sealing properties. In particular, the portion of the stopper 337 that fits into the opening 305 of the lid 304 can be formed slightly larger than the opening 305, such that a sealing-interference fit is formed between the stopper 337 and the opening of the lid 304. Thus, when the flip closure 307 is in the closed position, the interaction between the stopper 337 and the opening 305 can form a compression-type of gasket between the opening 305 and the stopper 337 to help prevent the contents from exiting the opening 305. Likewise, the protuberances 339 can be formed slightly larger than the ports 317 in the channel to form a sealing-interference fit or a compression-type gasket. In this way, the flip closure 307 helps to prevent the contents of the container (e.g. container 102) from leaking when the flip closure 307 is in the closed position. Also, the cam 325 can be sized slightly larger than the slot 323 in the channel to form another interference fit to hold the flip closure 307 in the opened position to prevent the flip closure 307 from rotating about the hinge 333 while the user consumes the contents of the container.

Referring to FIGS. 14F and 14F1, the hinge 333 can be provided with two slots 343 extending parallel to the hinge and configured to align with the pins 313 located in the channel 315 on the lid 304. In certain examples, the slots 343 can each be lined with a gasket (not shown). As discussed below, the gaskets can be inmolded into the flip closure 307 during its formation. The gaskets formed in the slots 343 provide an additional seal, which can be water tight to prevent contents from contaminating or corroding the slots 343 of the flip closure 307. This can maintain the cleanliness and prolong the life of the flip closure 307 and lid 304, such that the flip closure 307 does not need to be replaced as often.

Figure 15A:
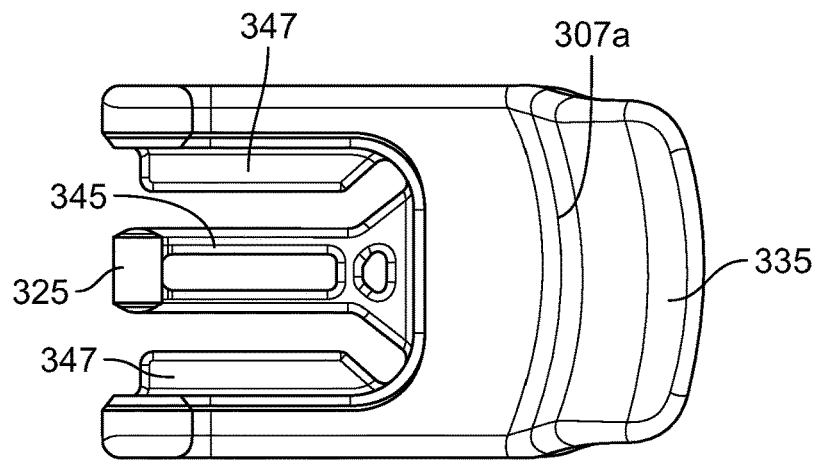
FIG. 15A shows a first portion of the example flip closure of FIG. 14A.
Figure 15B:
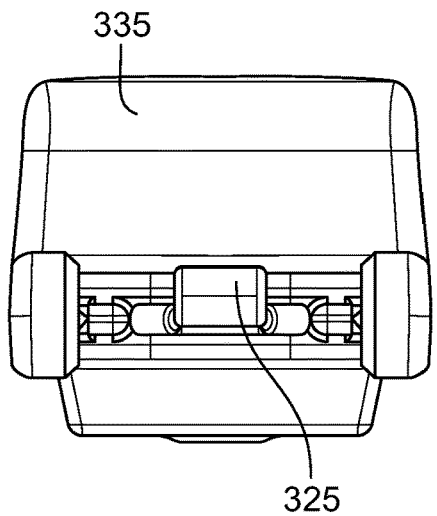
FIG. 15B shows a rear view of the first portion of FIG. 15A.
Figure 15C:
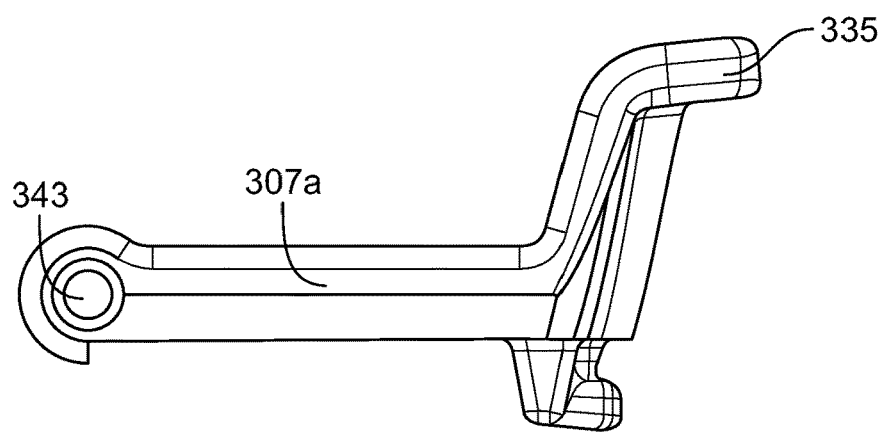
FIG. 15C shows a side view of the first portion of FIG. 15A.
Figure 16B:
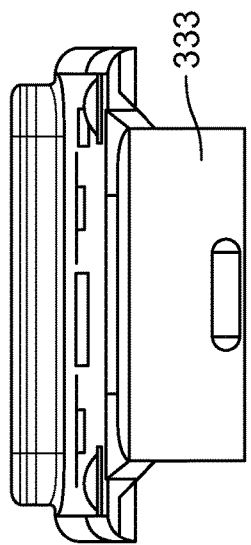
FIG. 16B shows an inverted front view of the second portion of FIG. 16A.
Figure 16D:
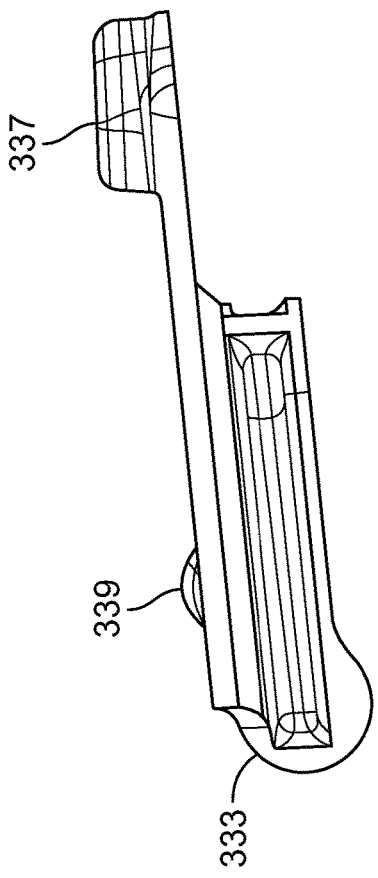
FIG. 16D shows an inverted side view of the second portion of FIG. 16A.
Figure 16A:
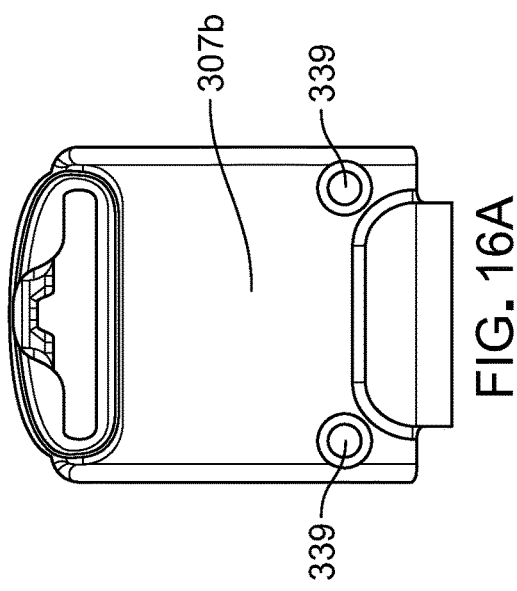
FIG. 16A shows a bottom view of a second portion of the example flip closure of FIG. 14A.
Figure 16C:
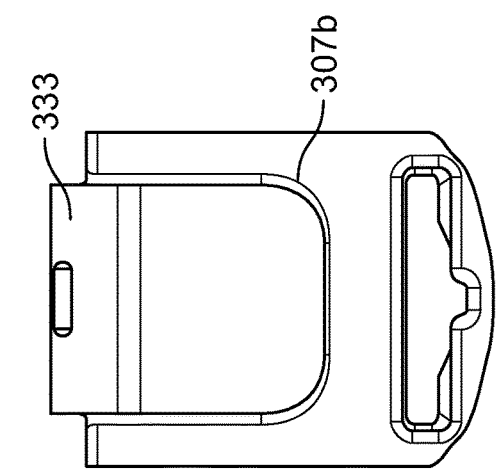
FIG. 16C shows a top view of the second portion of FIG. 16A.

Referring now to FIGS. 15A-15C and 16A-16D, the flip closure 307 is formed of a first portion 307a and a second portion 307b. The first portion 307a is illustrated in FIGS. 15A-15C where 15A shows a top view of the first portion 307a, FIG. 15B shows a rear view of the first portion 307a, and FIG. 15C shows a side view of the first portion 307a. Also the second portion 307b is shown in FIGS. 16A-16D, where 16A shows a bottom view of the second portion 307b, FIG. 16B shows an inverted front view, FIG. 16C shows a top view of the second portion 307b, and FIG. 16D shows an inverted side view of the second portion 307b. The flip closure 307 can be formed by a two shot process, where the first section 307a is formed and then the second section 307b is overmolded over and within the first section 307a. In one example, the second section 307b of the flip closure 307 can be formed of an elastomer, such as a soft rubber material and may be a thermoset or thermoplastic and can be either a natural or synthetic rubber material.

As illustrated in FIGS. 15A-15C, the first portion 307b can be provided with various guides or areas for receiving the second section 307b or shot of material therein. The first section 307a can be provided with a post 345 for receiving the cam 325 such that the second portion 307b or second shot of material can be formed surrounding the cam 325. Also the first portion 307b can be provided with two guide flanges 347 for receiving the second portion 307b or second shot of material. The first portion 307b can also include a downwardly depending tab 349 and a notch 351 such that the second portion 307b or second shot of material can be formed around the tab and within the notch to form the stopper 337. Additionally, as illustrated in FIGS. 16A-16C, the stopper 337 and the protuberances 339 can be formed of the second portion, which as discussed above, can be an elastomeric material. The elastomeric properties of the material help to provide seals between the flip closure 307 and the lid 304.

Also as shown in the cross-sectional views of FIGS. 14E, 14F1, 14G1, the elastomeric material can fill internal voids in the first portion 307a of the flip closure 307 such that the elastomeric material forms a portion of the internal structure of the flip closure 307. This provides a first area 353 and a second area 355 on the flip closure 307 where the second area 355 is more flexible than the first area 353. Specifically, this provides a degree of elasticity in the second area 355 along the rotational axis or the knuckle 333 of the flip closure 307 such that the flip closure 307 flexes in order to easily assemble the flip closure 307 onto the pins 313. Additionally, during the application of the second portion to the flip closure 307, the slots 343 may also be provided with the elastic material to form gaskets therein.

In other examples, the lid 304 discussed herein can also be insulated by one or more of the methods discussed herein. Other suitable methods for insulating any of the lids discussed herein are discussed in U.S. application Ser. Nos. 14/971,788 and 14/971,779 both filed on Dec. 15, 2015, which are fully incorporated herein by reference for any and all non-limiting purposes.

FIGS. 17 and 18 depict another implementation of a lid 400. The lid 400 may be similar to lids 104 and 210 in many respects and like reference numerals may refer to the same or similar elements in lids 104 and/or 210 but include 400 series reference numerals. Lid 400 is different from lids 104 and 210 in that lid 400 is a two-part lid having a lower cap or portion 403 that may be configured to be removably-coupled to the container 102 and an upper cap or portion 401 that may be configured to be removably-coupled to the lower cap 403.

Figure 17A:
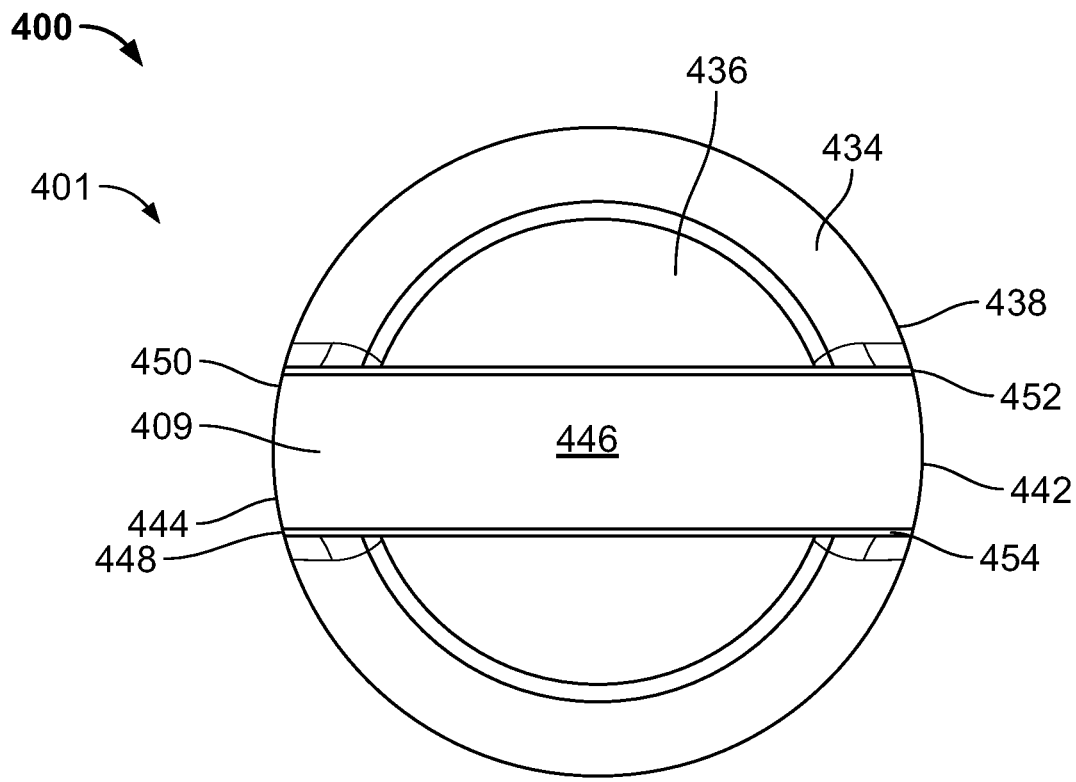
FIG. 17A depicts a top view of an upper portion of a lid structure, according to one or more aspects described herein.
Figure 17B:
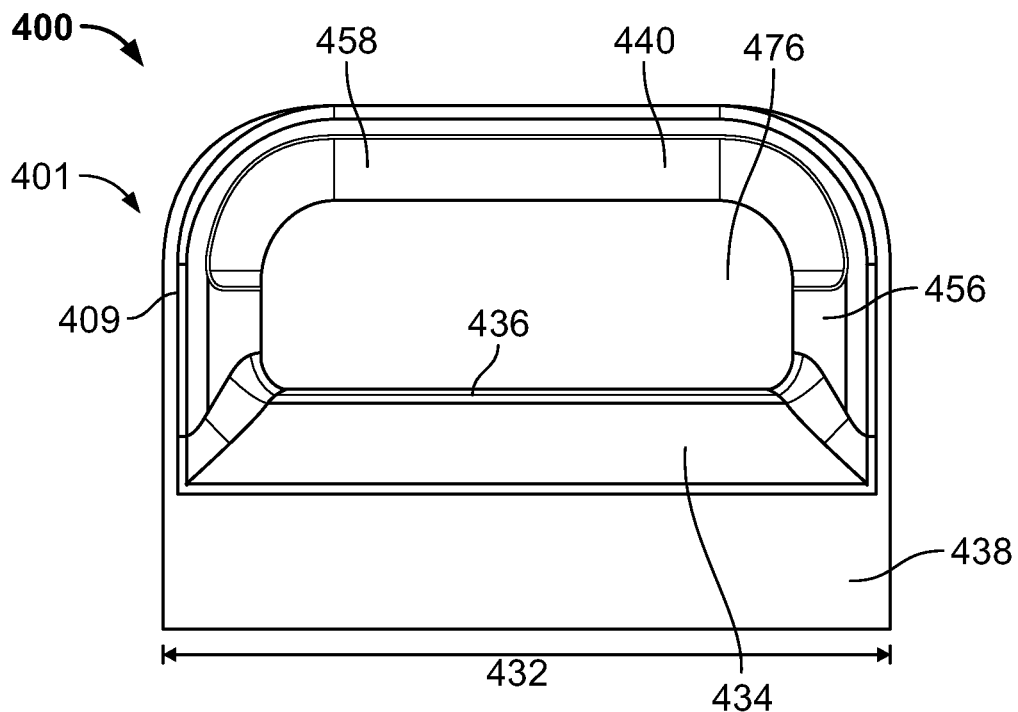
FIG. 17B depicts a front view of an upper portion of a lid structure, according to one or more aspects described herein.
Figure 17C:
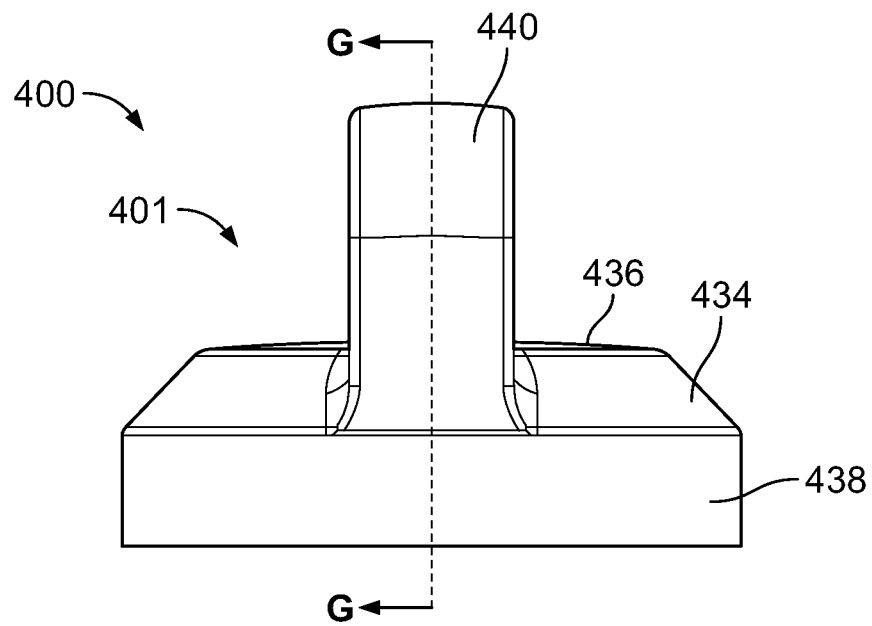
FIG. 17C depicts a side view of an upper portion of a lid structure, according to one or more aspects described herein.

Referring first to FIGS. 17A-D, the upper cap 401 may be configured to be removably-coupled to the lower cap 403. FIG. 17A depicts a top view of the upper cap 401, where the upper cap 401 has an outer diameter 432. In one example, outer diameter 432 may measure approximately 76.7 mm or about 77 mm. In another example, the outer diameter 432 may measure at or between approximately 60 and/or 90 mm. However, outer diameter 432 may be embodied with any dimensional value without departing from these disclosures. As best shown in FIGS. 17A and 17C, the upper cap 401 may be formed as a frustoconical surface 434 spaced between a circular top surface 436 and a cylindrical surface 438. A handle 440 may be integrally-molded to the frustoconical surface 434, and coupled to the upper cap 401 at two diametrically-opposed points 442 and 444. In one example, the handle 440 may have an outer surface 446, with at least a portion of the outer surface 446 having circular curvature concentric with, and having a radius equal to, the cylindrical surface 438. For example, the circular curvature of the outer surface 446 may be concentric with, and have a radius equal to the cylindrical surface 438 between points 448 and 450, and also between points 452 and 454. Accordingly, this portion of the outer surface 446 of the handle 440 may have a radius of curvature equal to about 37.9 mm. In another example, this portion of the outer surface 446 of the handle 440 may have a radius of curvature measuring at or between 30 and/or 45 mm. However, this radius of curvature of the handle 440 may have any dimensional value, without departing from the scope of these disclosures.

FIG. 17B depicts an elevation view of the upper cap 401. The handle 440 may have an inner surface 456 that has an overmolded grip 458. In one implementation, the overmolded grip 458 may be an elastomer, such as silicone rubber. However, any polymer may be utilized as the overmolded grip 458. Further, in another implementation, the inner surface 456 of the handle 440 may not include the grip 458, without departing from these disclosures.

The handle 440 may have an opening 476 that is configured to receive one or more fingers of the user. In one implementation, the opening 476 may have a height and a width. In one example, the height may measure 19.2 mm. In another example, the height may measure at or between 15 and/or 25 mm. Further, the width may measure 45 mm. In other examples, the width may measure at or between 40 and/or 60 mm. As such, the opening may have an opening area measuring between 600 and 1500 $mm^2$. In one example, the opening 476 may be configured to receive at least two fingers of an average-sized adult hand. In another example, the opening 476 may be configured to receive at least three fingers of an average-sized adult hand.

Figure 17D:
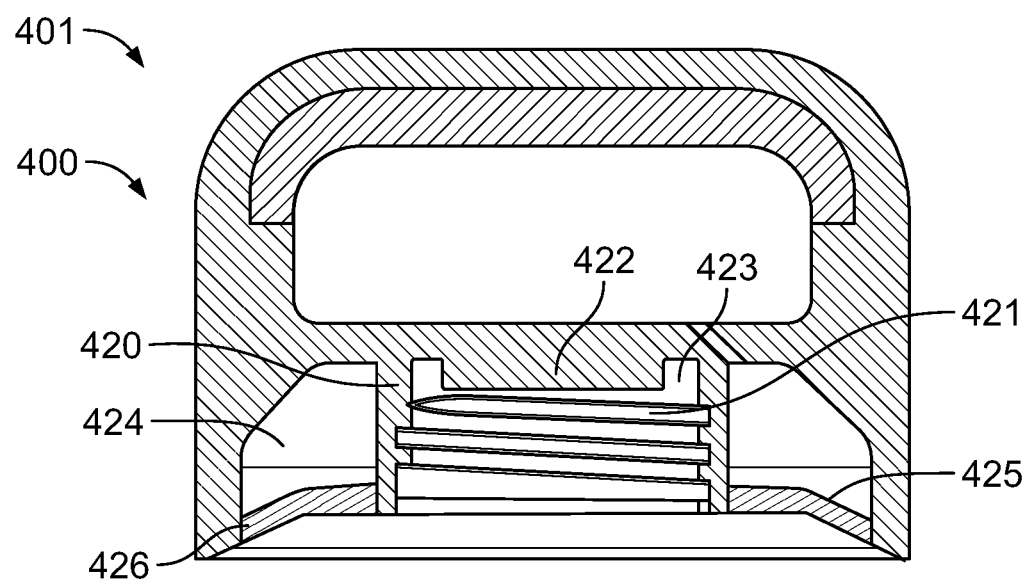
FIG. 17D depicts a cross-sectional view of the lid structure of FIG. 17C taken along line G-G.
Figure 18A:
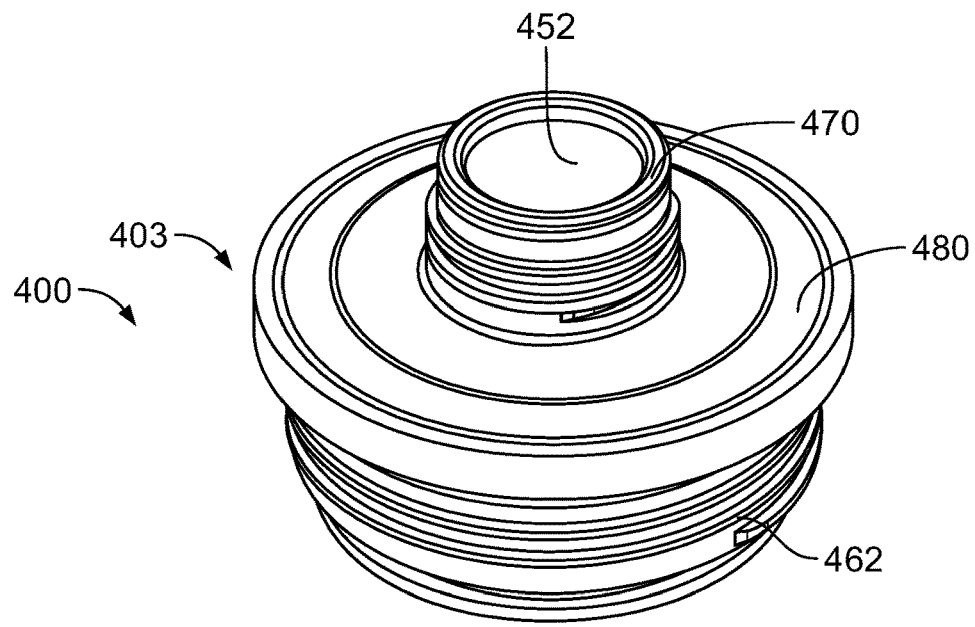
FIG. 18A depicts an isometric view of a lower portion of a lid structure, according to one or more aspects described herein.
Figure 18B:
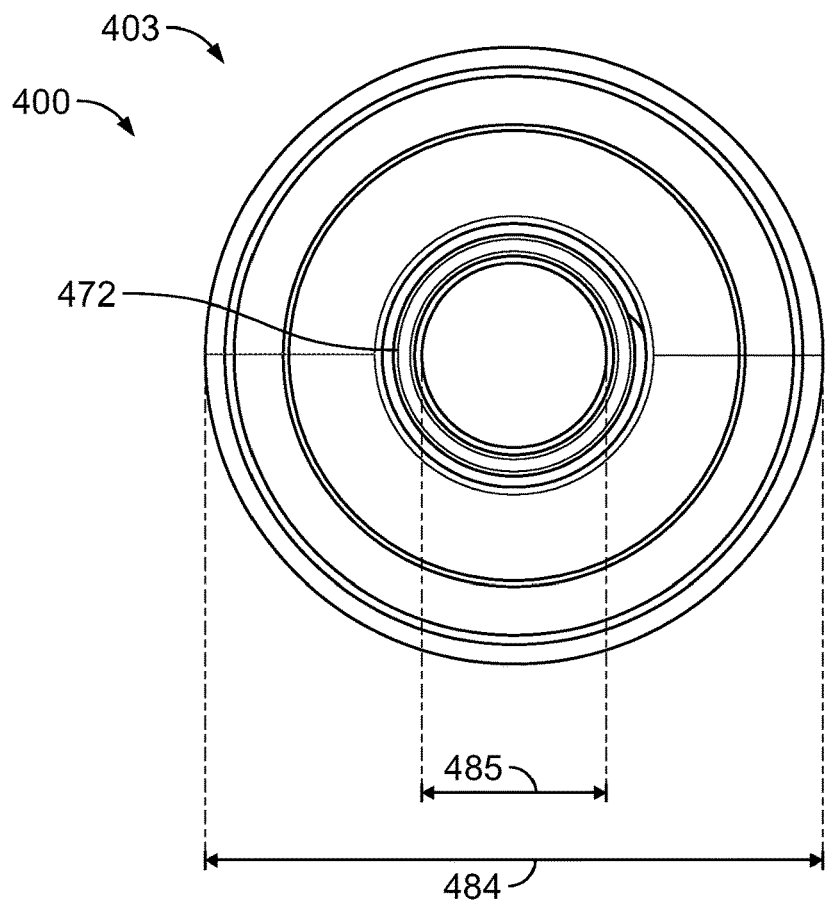
FIG. 18B depicts a top view of a lower portion of a lid structure, according to one or more aspects described herein.
Figure 18C:
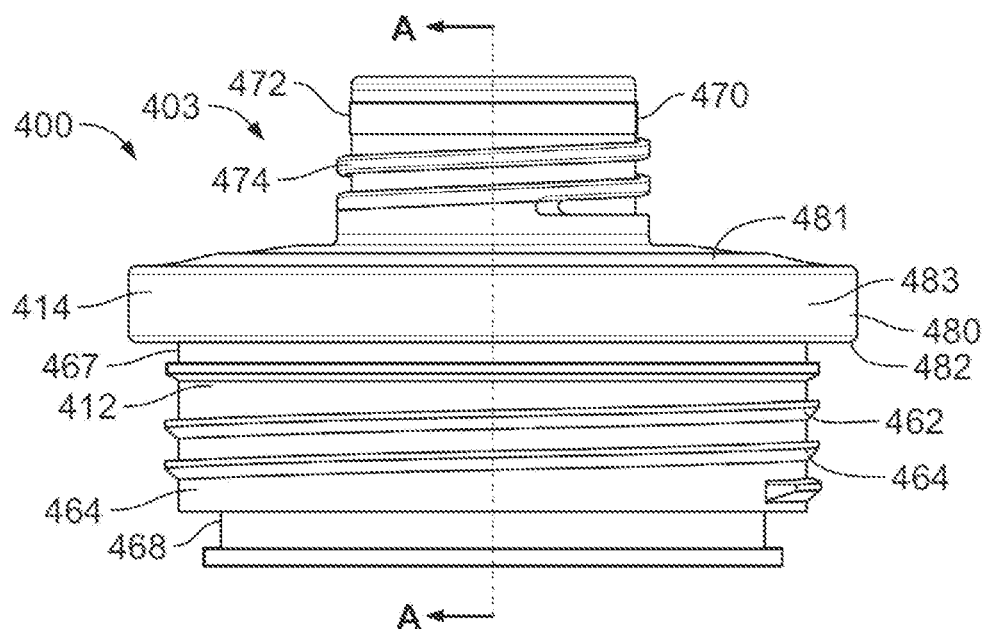
FIG. 18C depicts a side view of a lower portion of a lid structure, according to one or more aspects described herein.

Referring now primarily to FIGS. 17D and 18A, the upper cap 401 may be configured to be removably-coupled to the lower cap 403. As shown in FIG. 17D, the annular wall 420 may include threads 421 on an inner surface of the annular wall 420. As will be described in more detail below, the threads 421 are configured to removably engage similar threads on the lower cap 403. The upper cap 401 may also include a raised circular portion 422 which forms an annular channel 423 between the raised circular portion 422 and the annular sidewall 420. The annular channel 423 may be configured to accept a gasket (not shown) to create a seal against an upper surface of the lower cap 403.

In some examples an annular area 424 may exist between an outside surface of the annular wall 420 and inside surfaces of the frustoconical surface 434, the circular top surface 436, and/or the cylindrical surface 438. This annular area 424 may be hollow. The area 424 may also be configured to receive a mass of insulating material, such as a foam insert. This foam insert may, in one example, be polystyrene. However, additional insulating materials may be utilized with the disclosures described herein. In one implementation, the area 424 may be a vacuum cavity. In another example, the area 424 may be configured to receive a vacuum-insulated structure which may be a ring-shaped structure. In one implementation, the vacuum-insulated ring-shaped structure may be in-molded into the cavity 424. In certain examples, the vacuum-insulated ring-shaped structure may be constructed from a metal or alloy, such as stainless steel. In other examples, the vacuum-insulated ring-shaped structure may be constructed from a polymer, a ceramic, or a fiber-reinforced material, or combinations thereof. Further, the vacuum-insulated ring-shaped structure may have any dimensional values, without departing from the scope of these disclosures. In certain examples, the vacuum-insulated ring-shaped structure may have a substantially cylindrical shape, but may have chamfered and/or filleted edges. In another example, the vacuum insulated ring-shaped structure may have a shape configured to complement the shape of the area 424 such that it has a cylindrical surface corresponding to the cylindrical surface 438, a frustoconical surface corresponding to the frustoconical surface 434, and a circular top surface corresponding to the circular top surface 436. In still other embodiments, the annular area 424 may be solidly filled with the same material as other portions of the top cap 401. The top cap 401 may also include a ring shaped lower wall 425 extending from a lower end of the annular wall 420 to a lower end of cylindrical surface 438. This lower wall may enclose the annular area 424. In some embodiments, and as shown in FIG. 17D the lower wall 425 may include tapered portions 426 which may correspond to similarly shaped portions on the lower cap 403. The lower wall 425 may be integrally formed with the other portions of the upper cap 401 or it may be formed separate from the other portions of the upper cap and later attached to the upper cap 401. For example, the lower wall 425 may attached to the other portions of the upper cap 401 using coupling processes, such as, among others, spin welding, gluing, ultrasonic welding, an interference fit, a threaded coupling, or use of one or more fasteners (such as rivets, screws or bolts) or combinations thereof.

In one embodiment, the upper cap 401 may be formed using a two-shot molding process, whereby the upper cap 401 is formed with a first shot of polymer material and the grip 458 may be overmolded onto the other portions of the upper cap. As described above, the lower wall 425 may then be attached to the other portions of the upper cap 401. In other implementations, the upper cap 401 may be formed using additional or alternative forming processes. For example, it is also contemplated that the upper cap 401 can be formed by a single injection molding process or a three-shot molding process. In various implementations, the upper cap 401 may be formed of a single, or multiple polymer materials, including, among others, Acrylonitrile Butadiene Styrene, polypropylene, polyethylene, polystyrene, polyvinyl chloride, nylon, polycarbonate or acrylic, or combinations thereof. In some examples the upper cap 401 or portions of the upper cap 401 may be formed of a transparent material, semi-transparent material, or opaque material.

Referring now to FIGS. 18A-D, the lower cap may have an upper portion 470 configured to engage the upper cap 401, a lower portion 462 configured to engage the container 102, and a central section 480 between the upper 470 and lower 462 portions. The upper portion 470 may include an annular sidewall 472 extending upward from top surface 481 of the central portion 480. The annular sidewall 472 may include threads 474 corresponding to threads 421 on the upper cap 401. The threads 474 may not extend the full height of the annular wall 472. In some examples, the threads may extend less than ¾ the height of the annular wall 472 or less than ⅔ the height of the annular wall 472.

The lower cap 403 may also have a central portion 480. The central portion 480 may be cylindrically shaped and have an upper surface 481, a lower surface 482, and an outer surface 483. The central section 480 may have an outer diameter 484 of about 77 mm. In another example, the outer diameter 484 may measure at or between approximately 60 and 90 mm. In another example the outer diameter 484 of the lower cap 403 may be substantially similar to the outer diameter 432 of the upper cap 401. However, outer diameter 484 may be embodied with any dimensional value without departing from these disclosures. The annular wall 472 may have an inner diameter 485, shown in FIG. 18B. The inner diameter 485 may be about 23.3 mm. In another example, inner diameter 485 may measure at or between approximately 15 and/or 30 mm. However, inner diameter 485 may be embodied with any dimensional value without departing from these disclosures. The ratio of the outer diameter 484 to the inner diameter 485 may be about 3.3 or may be in the range of about 2.7 to about 3.9.

The lower cap 403 may also have a lower portion. The lower portion 462 may be similar to the lower portion of lid 210 discussed above. The lower portion 462 may have a cylindrical sidewall 464 having threads 466. The lower portion 462 may also include a lower channel 468 extending around a lower area of the sidewall 464 and an upper channel 467 extending around an upper area of the sidewall 464. Each of the channels 467 and 468 may be configured to retain a gasket (not shown in FIGS. 18A-D). The gasket(s) (not shown in FIGS. 18A-D) may be similar to those described related to FIGS. 12A-12E. For example, the lower cap 403 may include an upper gasket structure 416 (not shown) similar to gasket 216 and a lower gasket structure 418 (not shown) similar to gasket 218. The upper gasket structure 416 may be embodied as an o-ring gasket structure comprising one or more polymeric materials. Further, the upper gasket structure 416 may be embodied with any dimensional values (e.g. inner diameter, outer diameter, and/or height), without departing from the scope of these disclosures. The lower gasket structure 418 may be configured to seal the opening 118 by compressing against the lip structure 184 of the container 102. It is contemplated that the lower cap 403 may be embodied with any dimensional values, without departing from the scope of these disclosures.

Figure 18D:
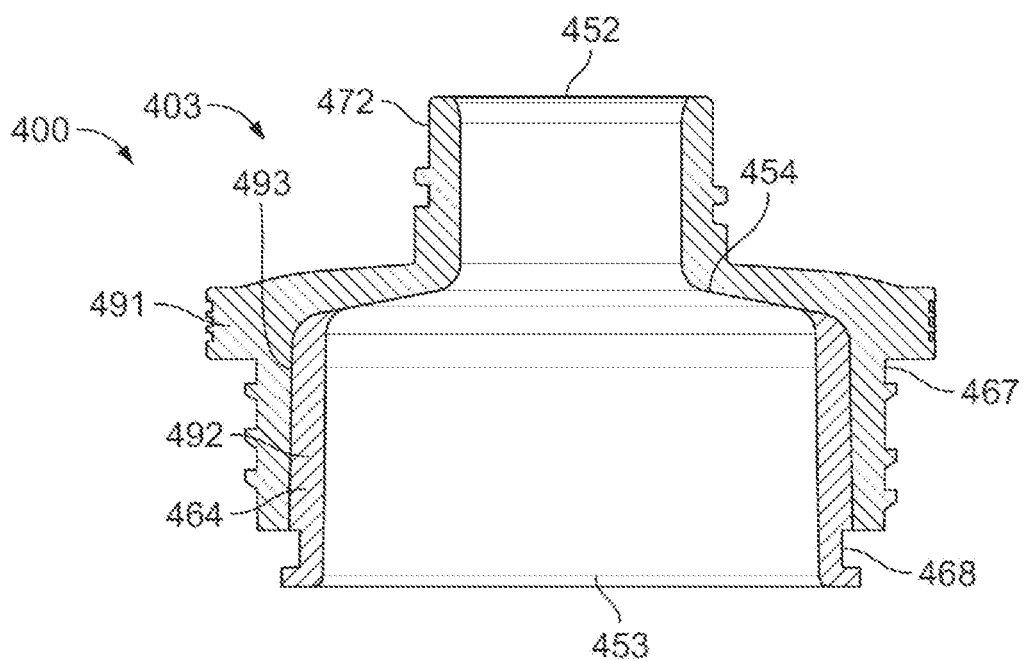
FIG. 18D depicts a cross-sectional view of the lid structure of FIG. 18C taken along line A-A.

Referring now primarily to FIG. 18D, the lower cap 403 may have an upper opening 452 defined by the inside surface of the upper annular wall 472 and a lower opening 453 defined by the inside surface of the cylindrical sidewall 464. As shown in FIG. 18D, the diameter of the upper opening 452 is less than a diameter of the lower opening 453. In some embodiments the ratio of the diameter of the upper opening 452 to the diameter of the lower opening 453 is less than about ½ or less than about ⅔. As shown in FIG. 18D, there may be a transition portion 454 wherein the internal diameter of the lower cap reduces from the lower opening 453 to the upper opening 452. The transition portion 454 may have a tapered shape such that the angle between inside surface of the upper annular wall 472 and the inside surface of the transition portion 454 is greater than 90 degrees. Such a configuration may allow liquid to more easily flow out of the lower cap 403 when the container 102 is in an inverted position.

Referring again primarily to FIG. 18D, in one embodiment, the lower cap 403 may be formed using a two-shot molding process, whereby a first portion 491 of the lower cap may be molded with a first shot of polymer material and a second portion 492 may molded with a second shot of polymer material. In other embodiments, the lower cap 403 may be formed using a three-shot molding process whereby a first portion 491 of the lower cap may be molded with a first shot of polymer material and a second portion 492 may molded with a second shot of polymer material and the first portion 491 and the second portion 492 may be rigidly-coupled to each other by a third shot of a polymer material at the interface 493 between the first 491 and second 492 portions. In this way, polymer interface element 493 acts like a weld seam to join the two portions 491 and 492. This three-shot injection molding process may utilize three different polymer materials (one for each of portions 491, 492, and 493). In another example, the three-shot injection molding process may utilize a same polymer material for portions 491 and 492, and a different polymer material for the polymer interface element 493. In yet another example, the three-shot injection molding process may utilize a same polymer material for the three portions 491, 492, and 493.

In other implementations, the lower cap 403 may be formed using additional or alternative forming processes. For example, the first portion 401 may be formed by a first molding process (injection molding or otherwise) of a polymer material, and the second portion 492 may be formed by a second molding process of a polymer material. Subsequently, the portions 491 and 492 may be coupled using an alternative coupling process, such as, among others, spin welding, gluing, ultrasonic welding, an interference fit, a threaded coupling, or use of one or more fasteners (such as rivets, screws or bolts) or combinations thereof. It is also contemplated that the lower cap 403 can be formed by a single injection molding process. In various implementations, the lower cap 403 may be formed of a single, or multiple polymer materials, including, among others, Acrylonitrile Butadiene Styrene, polypropylene, polyethylene, polystyrene, polyvinyl chloride, nylon, polycarbonate or acrylic, or combinations thereof. In some examples the lower cap 403 or portions of the lower cap 403 may be formed of a transparent material, semi-transparent material, or opaque material.

Referring now to the upper cap 401 and the lower cap 403, the threads 466 of the cylindrical sidewall 464 of the lower cap 403 may be received by a threaded sidewall 182 of the first inner wall 106 of the container 102. The lower cap 403 may be fully engaged with the container 102 upon rotation of the bottom cap 403 relative to the container 102 by any number of revolutions, or by any fraction of a revolution. For example, the bottom cap 403 may be fully engaged with the container 102 upon rotating the bottom cap 403 by approximately 1.5 full revolutions or approximately 1.75 full revolutions, or 2 or more full revolutions. The threads 474 of the upper annular wall 472 of the lower cap 403 may be received by the threads 421 of the annular sidewall 420 of the upper cap 401. The top cap 401 may be fully engaged with bottom cap 403 upon rotation of the top cap 401 relative to the bottom cap 403 by any number of revolutions, or by any fraction of a revolution. For example, the top cap 401 may be fully engaged with the bottom cap 403 upon rotating the top cap 401 by approximately ½ of a full revolution, or approximately ¾ of a full revolution, or 1 or more full revolutions. In some embodiments, the number of rotations required to engage the top cap 401 with the bottom cap 403 may be less than the number of rotations required to engage the bottom cap 403 with the container 102. For example the ratio of number of rotations required to lock the top cap 401 to the bottom cap 403 to the number of rotations required to lock the bottom cap 403 to the container 102 may be less than ½ or less than ⅓.

Advantageously the overall resistance and/or coefficient of friction between the top cap 401 and the bottom cap 403 may be less than the resistance and/or coefficient of friction between the bottom cap 403 and the container 102. Thus, the amount of force necessary to rotate the upper cap 401 relative to the lower cap 403 may be less than the amount of force necessary to rotate the lower cap 403 relative to the container 102. Therefore, a user may disengage the top cap 401 from the bottom cap 403 without disengaging the bottom cap 403 from the container 102.

In one example, an insulating device formed of a material can include a container that has a first inner wall having a first end having a threaded sidewall and an opening extending into an internal reservoir for receiving liquid, and a second outer wall forming an outer shell of the container. The second outer wall can include a second end configured to support the container on a surface. The container can also include a sealed vacuum cavity forming an insulated double wall structure between the first inner wall and the second outer wall. The insulating device can also include a lid for sealing the opening of the container, with the lid having an upper portion that has a frustoconical surface between a circular top surface and a cylindrical surface. The upper portion of the lid may also have a handle that is molded to the frustoconical surface at two diametrically-opposed points. Further, the handle may have an outer surface with a portion of the outer surface having a circular curvature that is concentric with, and has a radius equal to, the cylindrical surface of the upper portion of the lid. The handle may also have an inner surface that has an overmolded grip. The upper portion of the lid may have a sidewall that has an upper threaded area configured to be received into the threaded sidewall of the first inner wall of the container, and a channel that extends around a lower area of the sidewall. A c-shaped gasket may be positioned within the channel. The c-shaped gasket may be compressed against a lip structure that extends from the first inner wall of the container when the upper threaded area of the sidewall is received by the threaded sidewall of the first inner wall. The upper portion of the lid may be coupled to the lower portion by a three-shot injection molding process, such that the upper portion may be injection molded with a first shot of polymer, the lower portion may be injection molded with a second shot of polymer, and the upper portion coupled to the lower portion by a third shot of polymer injected at the interface between the upper portion and the lower portion. A sealed cavity may be formed between the upper portion and the lower portion of the lid. The first inner wall, the second outer wall may be stainless steel or titanium.

In another example, an insulating device formed of a material can include a container that has a first inner wall having a first end having a threaded sidewall and an opening extending into an internal reservoir for receiving liquid, and a second outer wall forming an outer shell of the container. The second outer wall can include a second end configured to support the container on a surface. The container can also include a sealed vacuum cavity forming an insulated double wall structure between the first inner wall and the second outer wall. The insulating device can also include a lid for sealing the opening of the container, with the lid having an upper portion that has a frustoconical surface between a circular top surface and a cylindrical surface. The upper portion of the lid may also have a handle that is molded to the frustoconical surface at two diametrically-opposed points. Further, the handle may have an outer surface with a portion of the outer surface having a circular curvature that is concentric with, and has a radius equal to, the cylindrical surface of the upper portion of the lid. The upper portion of the lid may have a sidewall that has an upper threaded area configured to be received into the threaded sidewall of the first inner wall of the container, and a channel that extends around a lower area of the sidewall. A gasket may be positioned within the channel. The gasket may be compressed against a lip structure that extends from the first inner wall of the container when the upper threaded area of the sidewall is received by the threaded sidewall of the first inner wall. A sealed cavity may be formed by the upper portion of the lid being coupled to the lower portion.

A method of forming an insulating device can include one or more of forming a container with a first inner wall of a material defining a first end of the container, the first end having a threaded sidewall and an opening extending into an internal reservoir for receiving liquid, forming a second outer wall of the material into an outer shell for the container, the second outer wall defining a second end of the container configured to support the container on a surface. The method can also include sealing a vacuum cavity between the first inner wall and the second outer wall to create an insulated double wall structure. In one example, the method can include forming an upper portion of the lid that has a frustoconical surface between a circular top surface and a cylindrical surface. A handle to be formed that is integrally-molded to the frustoconical surface at two diametrically-opposed points, with the handle having an outer surface that has a portion with a circular curvature that is concentric with that has a radius equal to the cylindrical surface of the upper portion. The method may also overmold a grip on an inner surface of the handle. Further, the method may form a lower portion of the lid that has a sidewall with an upper threaded area to be received into the threaded sidewall of the first inner wall of the container, the lower portion may also have a channel extending around a lower area of the sidewall for retention of a gasket.

In another example, a closure may have an upper portion formed from a first amount of polymer material, a grip may be overmolded onto the upper portion, and a lower portion may be formed by injection molding a second amount of polymer material. The upper portion may be joined to the lower portion by a third amount of polymer material forming a weld seam. In one example, the second amount of polymer material and the third amount of polymer material may comprise the same material. In another example, the first amount of polymer material, the second amount of polymer material, and the third amount of polymer material may be different materials. In yet another example, the first amount of polymer material and the second amount of polymer material may be formed from a same polymer material, and the third amount of polymer material may be formed from a different polymer material. In another implementation, an insulating puck may be placed between the upper portion and the lower portion of the closure.

An example lid may include a body having a top wall having a channel with an opening for pouring the contents from a container, a pair of pins, at least one port for venting, and a side wall configured to secure to the container. The body can be formed of an outer cap, an inner cap, and a rim, and the outer cap can be formed of a transparent or semi-transparent material. The body may be formed in a three-shot molding process. The top wall of the body may be clear or semi-transparent such that the user can see the contents within the container.

The lid may also include a flip closure configured to rotate on the body from an opened position to a closed position. The flip closure may also include a stopper configured to be inserted into the opening for selectively sealing the opening, a pair of slots configured to receive a pair of gaskets therein. The gaskets can be configured to receive the pair of pins of the body. The flip closure may further include a cam that is configured to engage the body to maintain the flip closure in the opened position, and the flip closure may be formed in a two-shot molding process. Specifically, the flip closure can be formed of a first portion and a second portion, and the second portion can be formed of an elastic material. The first portion of the flip closure can include the cam, and the cam can extend from a post. The post can provide a guide for receiving the second portion. The flip closure can include a first area and a second area, and the second area can be more flexible than the first area such that the flip closure can be assembled to the body. The second area can include the pair of slots and the first area can include the stopper. The stopper may form a compression gasket together with the opening of the body.

In another example a lid may include a body formed of an outer cap, an inner cap, and a rim. The outer cap can include a top wall having a channel with an opening for pouring the contents from a container, a pair of pins, at least one port for venting, and a side wall configured to secure the lid to the container. The outer cap can be formed of a transparent or semi-transparent material.

The lid may also include a flip closure formed of a first portion and a second portion. The second portion can be formed of an elastic material, and the flip closure can be configured to rotate on the body from an opened position to a closed position. The flip closure can include a stopper configured to be inserted into the opening for selectively sealing the opening, and a pair of slots configured to receive a pair of gaskets. The gaskets can be configured to receive the pair of pins of the body, and the flip closure can further include a cam configured to engage the body to maintain the flip closure in the opened position. In one example, the first portion of the flip closure can include the cam and the cam can extend from a post. The post may provide a guide for receiving the second portion of elastic material. The flip closure can include a first area and a second area and the second area can be more flexible than the first area such that the second area can be compressed to assemble the flip closure to the body. The second area can include the pair of slots and the first area can include the stopper.

An example method of forming a lid may include forming a body using a three-shot molding process comprising forming an outer cap, an inner cap, and a rim, forming a channel in the outer cap and forming an opening in the channel for pouring the contents from a container, inmolding a pair of pins into the channel and forming at least one port for venting in the channel, and forming a side wall on the outer cap and configuring the sidewall to be secured to the container. The example method may also include forming a flip closure in a two-shot molding process of a first portion and a second portion. The first portion can be formed first with a pair of slots and a cam. The second portion can be formed of an elastic material around the first portion, and the second portion can be formed with a stopper configured to be inserted into the opening for selectively sealing the opening. Also, a pair of gaskets can be formed in the slots with the elastic material. The gaskets can be configured to receive the pair of pins of the body and flip closure can be configured to rotate on the body from an opened position to a closed position. The body of the lid can be configured to receive the cam to maintain the flip closure in the opened position. The stopper can be configured to form a compression gasket together with the opening of the body. The flip closure can be formed of a first area and a second area and the second area can be formed more flexible than the first area such that second area can be compressed and the flip closure can be assembled to the body. The outer cap can be formed of a transparent or semi-transparent material.

The present disclosure is disclosed above and in the accompanying drawings with reference to a variety of examples. The purpose served by the disclosure, however, is to provide examples of the various features and concepts related to the disclosure, not to limit the scope of the disclosure. One skilled in the relevant art will recognize that numerous variations and modifications may be made to the examples described above without departing from the scope of the present disclosure.

What is claimed is:

1. A lid comprising:
   a body having a top wall having a channel with an opening for pouring the contents from a container, a pair of pins, at least one port for venting, and a side wall configured to secure the lid to the container;
   a flip closure configured to rotate on the body from an opened position to a closed position, the flip closure comprising a stopper configured to be inserted into the opening for selectively sealing the opening, a pair of slots configured to receive a pair of gaskets therein and the gaskets configured to receive the pair of pins of the body, the flip closure further comprising a cam configured to engage the body to maintain the flip closure in the opened position;
   wherein the flip closure is formed of a first portion and a second and wherein the second is integrally formed and is formed of an elastic material and the second portion includes the stopper and the gaskets.

2. The lid of claim 1 wherein the body is formed of an outer cap, an inner cap, and a rim.

3. The lid of claim 2 wherein the outer cap is formed of a transparent or semi-transparent material.

4. The lid of claim 1 wherein the body is formed in a three-shot molding process.

5. The lid of claim 1 wherein the flip closure is formed in a two-shot molding process.

6. The lid of claim 1 wherein the first portion of the flip closure comprises the cam and the cam extends from a post and wherein the post provides a guide for receiving the second portion.

7. The lid of claim 1 wherein the flip closure comprises a first area and a second area and wherein the second area is more flexible than the second area such that the flip closure can be assembled to the body.

8. The lid of claim 7 wherein the second area comprises the pair of slots and the first area comprises the stopper.

9. The lid of claim 1 wherein the top wall is clear or semi-transparent such that a user can see the contents within the container.

10. The lid of claim 1 wherein the stopper forms a compression gasket together with the opening of the body.

* * * * *

UNITED STATES PATENT AND TRADEMARK OFFICE
CERTIFICATE OF CORRECTION

PATENT NO. : 10,737,851 B2
APPLICATION NO. : 15/628442
DATED : August 11, 2020
INVENTOR(S) : Sullivan et al.

Page 1 of 1

It is certified that error appears in the above-identified patent and that said Letters Patent is hereby corrected as shown below:

On the Title Page

Column 1, (72) Inventors, Lines 3-4:
Delete "(US); Roy Joseph Seiders, Rollingwood, TX (US)" and insert --(US)--

In the Specification

Column 4, Detailed Description, Line 62:
Delete "102" and insert --104--

Column 11, Detailed Description, Line 59:
Delete "307$b$" and insert --307a--

Column 11, Detailed Description, Line 65:
Delete "307$b$" and insert --307a--

Column 11, Detailed Description, Line 67:
Delete "307$b$" and insert --307a--

Signed and Sealed this
Twenty-second Day of December, 2020

Andrei Iancu
*Director of the United States Patent and Trademark Office*